(12) United States Patent
Pierce

(10) Patent No.: US 7,511,451 B2
(45) Date of Patent: Mar. 31, 2009

(54) ELECTRICAL ENERGY SOURCE

(76) Inventor: Gerald Pierce, 1433 Stable Run Dr., Cordova, TN (US) 38016

( * ) Notice: Subject to any disclaimer, the term of this patent is extended or adjusted under 35 U.S.C. 154(b) by 322 days.

(21) Appl. No.: 11/480,350

(22) Filed: Jul. 5, 2006

(65) Prior Publication Data

US 2007/0019453 A1    Jan. 25, 2007

Related U.S. Application Data

(60) Provisional application No. 60/697,161, filed on Jul. 7, 2005.

(51) Int. Cl.
*H02J 7/00* (2006.01)
(52) U.S. Cl. ........................ 320/103; 320/111; 320/116; 324/110; 361/601; 361/622; 361/625; 361/659; 361/663; 361/665; 361/666; 312/351.11
(58) Field of Classification Search ................. 320/103, 320/116, 111; 361/601, 622, 625, 659–661, 361/663, 665, 666; 312/351.11; 324/110
See application file for complete search history.

(56) References Cited

U.S. PATENT DOCUMENTS

| | | | |
|---|---|---|---|
| 4,673,826 A | | 6/1987 | Masson |
| 4,701,693 A | | 10/1987 | Nishimura |
| 4,709,200 A | | 11/1987 | Ochiai |
| 4,847,546 A | | 7/1989 | Bobier et al. |
| 4,963,811 A | | 10/1990 | Weber |
| 4,973,007 A | * | 11/1990 | Schippers et al. ......... 242/477.1 |
| 5,111,127 A | * | 5/1992 | Johnson ....................... 320/101 |
| 5,164,654 A | | 11/1992 | Bertram et al. |
| 5,206,579 A | * | 4/1993 | Kawate et al. .............. 320/148 |
| 5,301,456 A | | 4/1994 | Jobin et al. |
| 5,381,462 A | * | 1/1995 | Larson et al. .......... 379/106.06 |
| 5,576,533 A | | 11/1996 | Tantraporn |
| 5,594,313 A | | 1/1997 | Takeda |

(Continued)

FOREIGN PATENT DOCUMENTS

EP        0372933        6/1990

(Continued)

OTHER PUBLICATIONS www.alliedsun.com/how.htm "How Solar Works—Why photovoltaics?" retrieved on Apr. 25, 2006.

(Continued)

*Primary Examiner*—Akm E Ullah
*Assistant Examiner*—Arun Williams
(74) *Attorney, Agent, or Firm*—Richard C. Litman

(57) ABSTRACT

The electrical energy source includes a portable enclosure that houses at least one battery pack, at least one battery charger, at least one AC inverter and, optionally, a regeneration device that can power the battery charger. Operation of batteries, AC inverters and regeneration unit is coordinated by a control circuit. During operations under a load, the batteries supply an input to AC inverters which in turn provide voltage regulated AC power to the load. When the batteries have discharged to a predetermined level, the load is removed from the AC inverters, and a dedicated on-board inverter is used to power the regeneration unit which recharges the batteries. Once the batteries have been recharged, the AC inverters are again made available to the load.

20 Claims, 30 Drawing Sheets

U.S. PATENT DOCUMENTS

| | | | |
|---|---|---|---|
| 5,656,916 A * | 8/1997 | Hotta | 320/160 |
| 5,747,773 A * | 5/1998 | Griffin et al. | 219/130.1 |
| 5,780,993 A * | 7/1998 | Tsang | 320/111 |
| 5,811,958 A | 9/1998 | Yamamoto | |
| 5,845,204 A * | 12/1998 | Chapman et al. | 455/343.1 |
| 5,969,501 A | 10/1999 | Glidden | |
| 6,041,242 A | 3/2000 | Coulthard | |
| 6,201,181 B1 | 3/2001 | Azzam | |
| 6,291,764 B1 | 9/2001 | Ishida et al. | |
| 6,351,400 B1 | 2/2002 | Lumsden | |
| 6,396,239 B1 | 5/2002 | Benn | |
| 6,399,232 B1 * | 6/2002 | Eshraghi | 429/27 |
| 6,404,620 B1 * | 6/2002 | Piccione | 361/601 |
| 6,525,507 B2 | 2/2003 | Ganz | |
| 6,563,269 B2 | 5/2003 | Robinett | |
| 6,597,074 B2 * | 7/2003 | Tsujikado et al. | 307/66 |
| 6,894,439 B2 | 5/2005 | Stewart et al. | |
| 2002/0030411 A1 * | 3/2002 | Curtis et al. | 307/64 |
| 2002/0098412 A1 * | 7/2002 | Rodriguez et al. | 429/149 |
| 2002/0149950 A1 | 10/2002 | Takebayashi | |
| 2002/0149955 A1 | 10/2002 | Lumsden | |
| 2004/0174135 A1 | 9/2004 | Durham | |
| 2004/0262062 A1 * | 12/2004 | Berbari | 180/165 |
| 2004/0263118 A1 * | 12/2004 | Breen et al. | 320/116 |
| 2005/0057214 A1 | 3/2005 | Matan | |
| 2005/0151509 A1 * | 7/2005 | Cook | 320/116 |
| 2005/0226021 A1 | 10/2005 | Do | |
| 2007/0133241 A1 * | 6/2007 | Mumtaz et al. | 363/131 |

FOREIGN PATENT DOCUMENTS

| | | |
|---|---|---|
| JP | 57193977 | 11/1982 |

OTHER PUBLICATIONS www.4lots.com/power_inverter/xpower_3000_plus_inverter.htm xPower 3000 Plus Xantrex Power Inverter retrieved on Jun. 23, 2006.
www.topsalesdepot.com/bwadctoacpoil.html "3000 Watt DC to AC Power Inverter, 6000 Watt High Surge . . . " retrieved on Jun. 23, 2006.
www.rexresearch.com/auto2/stonbrg.htm "Largo man Builds Self-Charging Power Supply" retrieved on Jun. 22, 2006.
http://www.preparedwithpower.com/emergency/_downloads/FAQ_PP1500EP.pdf FAQ XPower Powerpack 1500 retrieved on Jun. 22, 2006.

* cited by examiner

ELECTRICAL ENERGY SOURCE

CROSS-REFERENCE TO RELATED APPLICATIONS

This application claims the benefit of U.S. Provisional Patent Application Ser. No. 60/697,161, filed Jul. 7, 2005, which is incorporated herein by reference.

BACKGROUND OF THE INVENTION

1. Field of the invention

The present invention relates to electrical energy sources and more specifically to substantially autonomous portable electrical energy sources.

2. Description of the Related Art

Mobile power supplies are often needed where electric appliance operation is desired during emergency situations when the public utility grid is unavailable. Since practically every electrical appliance requires 110V AC electricity to operate, the mobile power supply must have some means of generating alternating current within an acceptable voltage range.

One commonly used method involves the use of a fuel-driven generator. Such generators, however, are bulky and lack the versatility of portability in automobiles, convoys, boats, and the like. Fuel driven generators may also pollute and emit carbon monoxide which can be dangerous to users, especially in close quarters.

An alternative and more compact form of power source is based on solar energy that is converted to electrical power through the use of solar panels in conjunction with converters, inverters, and the like. However, these systems may be costly, while being unworkable during inclement weather conditions.

Inverters are also available to invert low direct current ("DC") voltage such as around 8-12 volts to alternating current ("AC") mains voltage levels, of around 110-120 volts. However, such inverters may be costly while rapidly depleting the DC voltage source.

Additional drawbacks of conventional power supplies and/or generators, notwithstanding the fact that they may be capable of providing a maximum AC output of 1000 Watts of power on a continuous operation of 12 hours, is that these primarily gasoline operated generators emit fumes and polluting hydrocarbons during their operations. Noise levels of such generators may be excessive, ranging from 47 dBA at ¼ load up to 57 dBA and higher at full load.

Moreover, power inverter systems having 12 Volts from a battery and converting the 12V to a 115 Volt AC household power, with output power at 2500-Watts continuous with a 5000-Watts surge has been known to electrical engineers and the public for years.

Japanese Patent No. 57-193,977, published Nov. 29, 1982 to Tokunaga Kiichi, et al., appears to show DC current control device that controls for output of maximum electric power, a secondary battery, and an inverter when converting DC power from solar batteries, but does not appear to disclose the present invention as claimed.

Similarly European Patent No. 0-372-933, published Jun. 13, 1990 to Nishi Kazuo, et al., appears to disclose providing an appliance with a power supply in the form of a solar energy accumulator, but does not appear to disclose the present invention as claimed.

Additionally, Japanese Patent No. 3-74,147, published Mar. 28, 1991 to Yamamoto Yoshiro, et al., appears to show a system having solar cell and diesel engine driven generator charging means for charging a storage battery, but does not appear to disclose the present invention as claimed.

Moreover, many of the aforementioned related art systems generally require an external 12 Volt battery source to operate, while outputting only AC Power.

Also, installation is generally required by hardwiring AC output to the battery, while the inverter may need mounting as well. When connected to a vehicle, boat, or RV, the aforementioned systems may require constant running of the engine to provide the 12-Volt power source, and thus severely limit the portability when operated with a vehicle.

Moreover, it is not uncommon for such a unit to require forty or more hours to fully charge its internal rechargeable battery. It would be desirable, however to provide a power inverter system having a predetermined minimum DC internal/portable voltage supply that can produce 2500-20000 watts AC and that has a reduced amount of time to fully charge its internal rechargeable battery system.

Thus, an electrical energy source solving the aforementioned problems is desired.

SUMMARY OF THE INVENTION

The electrical energy source includes a portable enclosure defining battery bank, monitor and control, along with AC inverter and regeneration compartments. Operation of batteries, AC inverters and regeneration unit is coordinated by a monitor and control unit. During operations under a load, the batteries supply an input to AC inverters which in turn provide AC power to the load.

When the batteries have discharged to a predetermined level, the load is removed from the AC inverters, and a dedicated inverter is used to power the regeneration unit which recharges the batteries. Once the batteries have been recharged, the AC inverters are again made available to the load. The system does not use an internal combustion engine, and thus does not require fossil fuels for operation.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
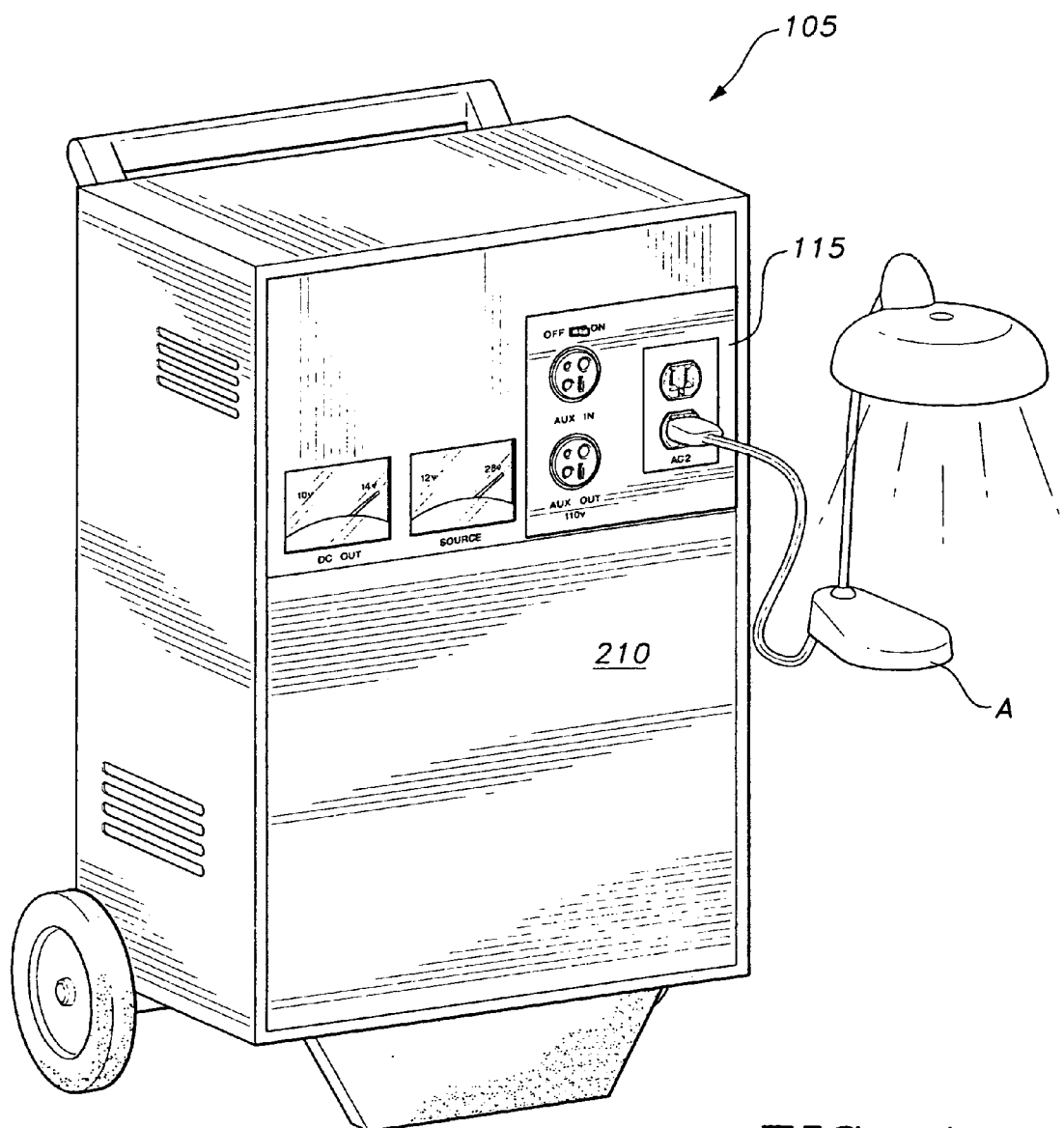
FIG. 1 is an environmental, perspective view of an electrical energy source according to the present invention.

As shown in FIGS. 1-5D, the present invention is a multi-purpose electrical power source that may be configured in various fixed and portable embodiments including wheeled versions, and non-wheeled versions that have grab handles for lifting. As shown in FIG. 1, the energy source 105 may be connected to power up an electrical load such as, e.g. lamp A. A preferable cabinet size of the energy source may be 30"W× 36"L×42"H. The energy source enclosure comprises a front chassis support 107 and two enclosure wheels 110 to the rear of the chassis support 107. The wheels 110 may be comprised of a hard rubber composition or similar durable material capable of rolling over a variety of surfaces. An interface panel 115 is provided as an inset to a front panel 210. The interface panel may include AC output receptacles 117 and an on/off switch 123. The single manual on/off switch 123 provides fully automatic operation once the unit 105 is turned on.

Additionally an auxiliary input receptacle 119 and an auxiliary output receptacle 121 are provided for easy access. DC output meter 125 is provided so that a user can monitor the DC output of the present invention. Referring to FIGS. 1 and 6C, a source meter 127 is provided so that a user can monitor the voltage level of the input to inverters 605, 609, and 612.

Figure 3:
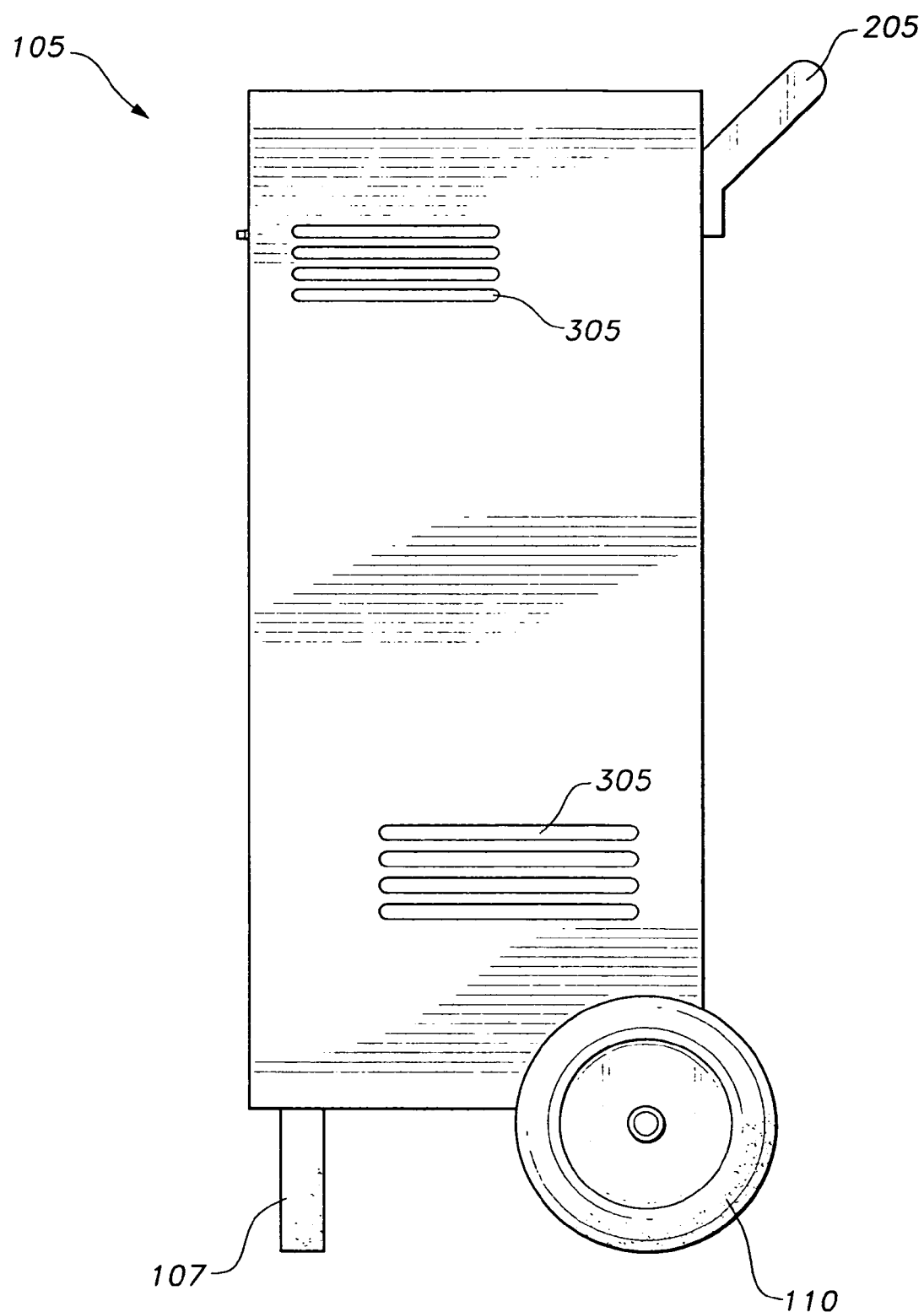
FIG. 3 is a side view of the electrical energy source, according to the present invention.
Figure 4A:
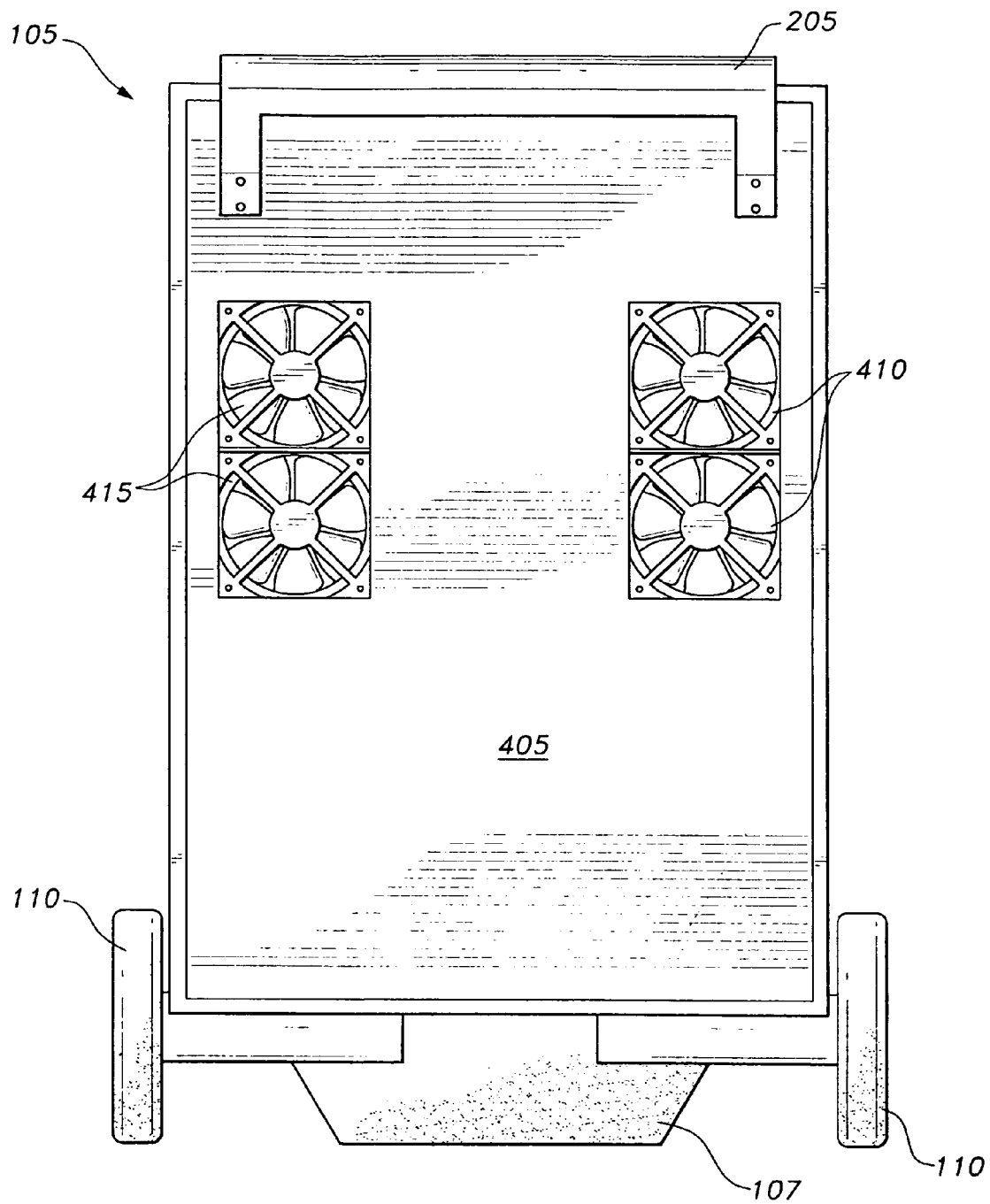
FIG. 4A is a rear view of the electrical energy source, according to the present invention.
Figure 4B:
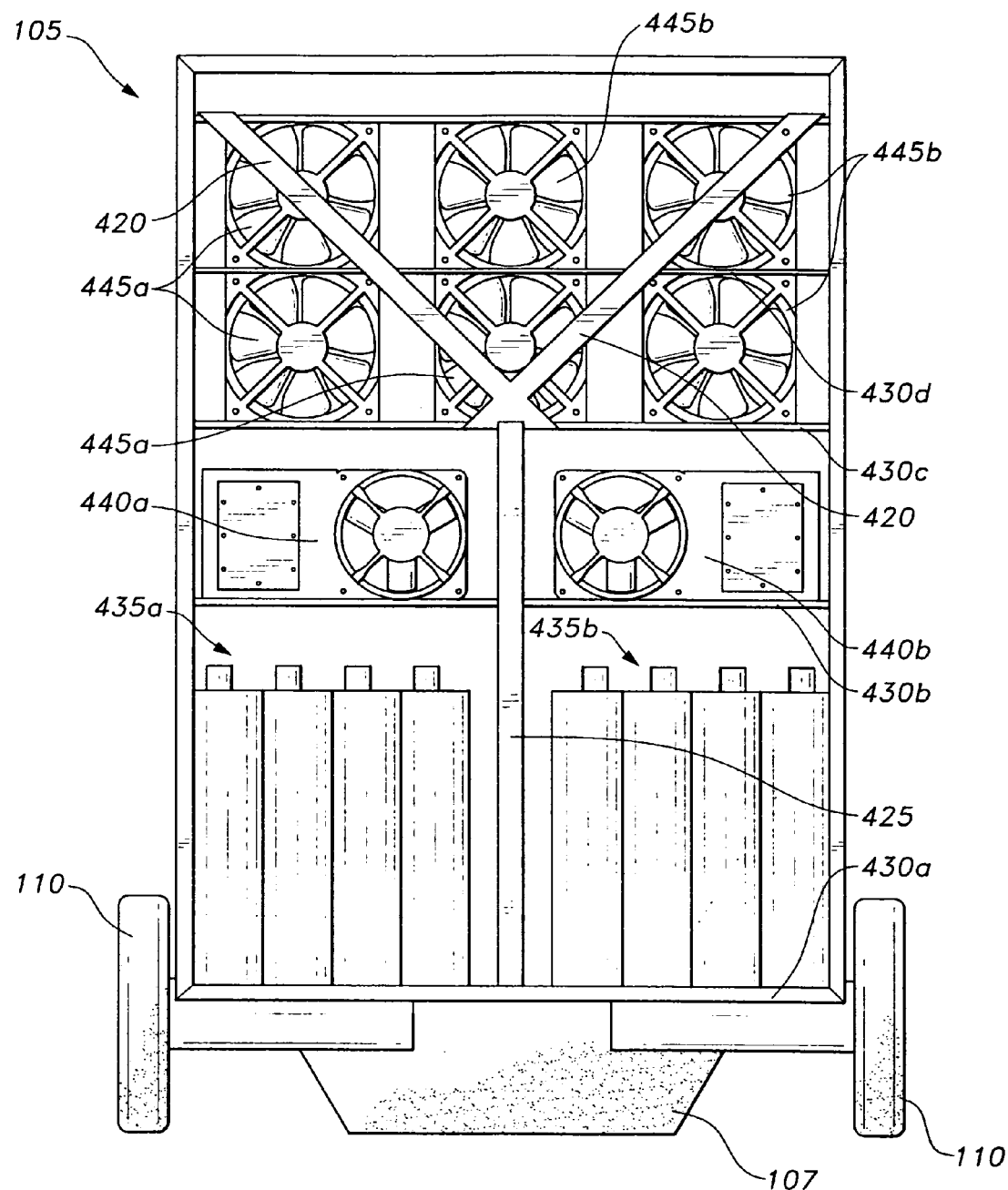
FIG. 4B is a rear view of the electrical energy source with the rear panel removed, according to the present invention.

A chassis handle 205 may be included to provide assistance in moving the device from place to place. As shown in FIG. 3, a side panel 303 may include ventilation ports 305. As shown in FIG. 4A, a rear cabinet panel 405 may include an input cooling fan 410 and an exhaust cooling fan 415. As shown in FIG. 4B, the enclosure is braced by diagonal upper frame braces 420 and vertical lower frame brace 425. The enclosure is divided into a first compartment floor 430a, a second compartment floor 430b, a third compartment floor 430c and a fourth compartment floor 430d. Compartment floors 430a through 430d house respectively, first bank of energy storage cells 435a, second bank of energy storage cells 435b, first and second charging units 440a, 440b, and, first and second banks of inverters 445a, 445b.

Figure 5A:
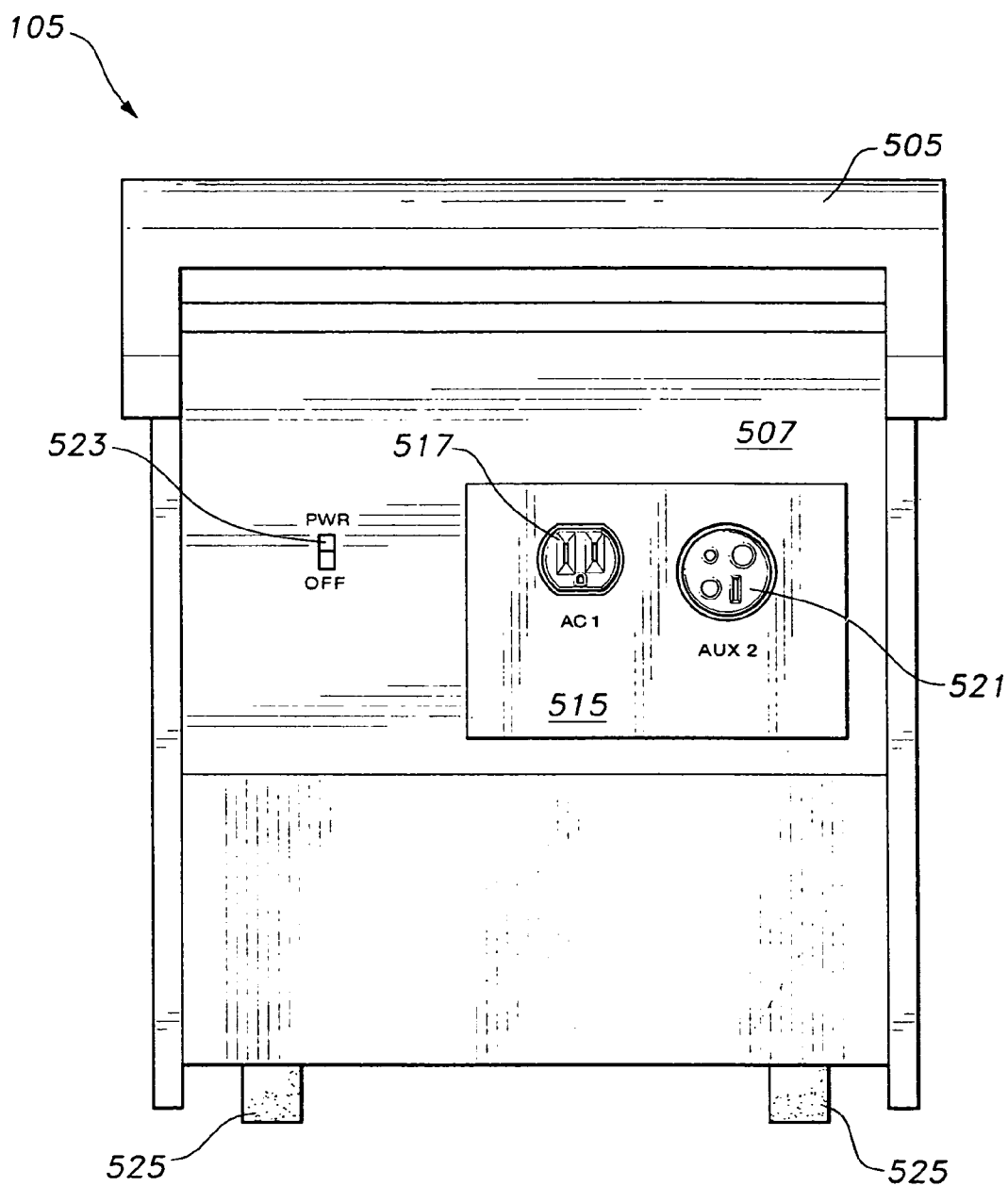
FIG. 5A is a front view of a non-wheeled, portable version of the electrical energy source, according to the present invention.

As shown in FIG. 5A, the non-wheeled, portable version of the electrical energy source 105 has a carrying handle 505, a front panel 507, an interface panel 515, a power switch 523 and support rests 525. AUX2 OUT port 521 and AC outlet 517 are also provided.

Figure 5B:
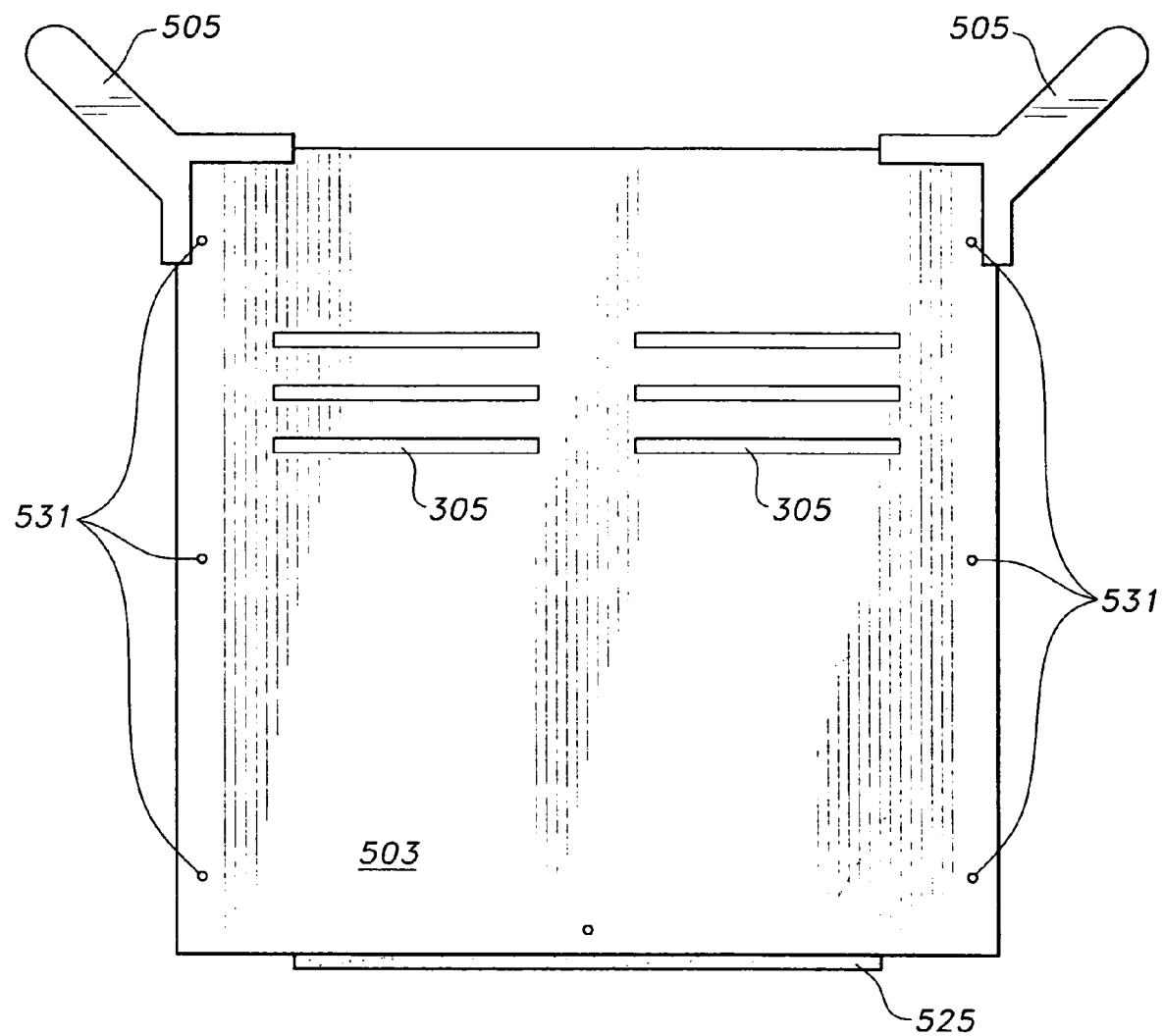
FIG. 5B is a side view of a non-wheeled, portable version of the electrical energy source, according to the present invention.

FIG. 5B shows a side view of the non-wheeled portable version of the electrical energy source 105. A side panel 503 has ventilation ports 305. Carrying handles 505 are disposed along corners where the side panels meet a top panel. Panels are fastened together with fasteners 531 which may be rivets, screws, and the like.

Figure 5C:
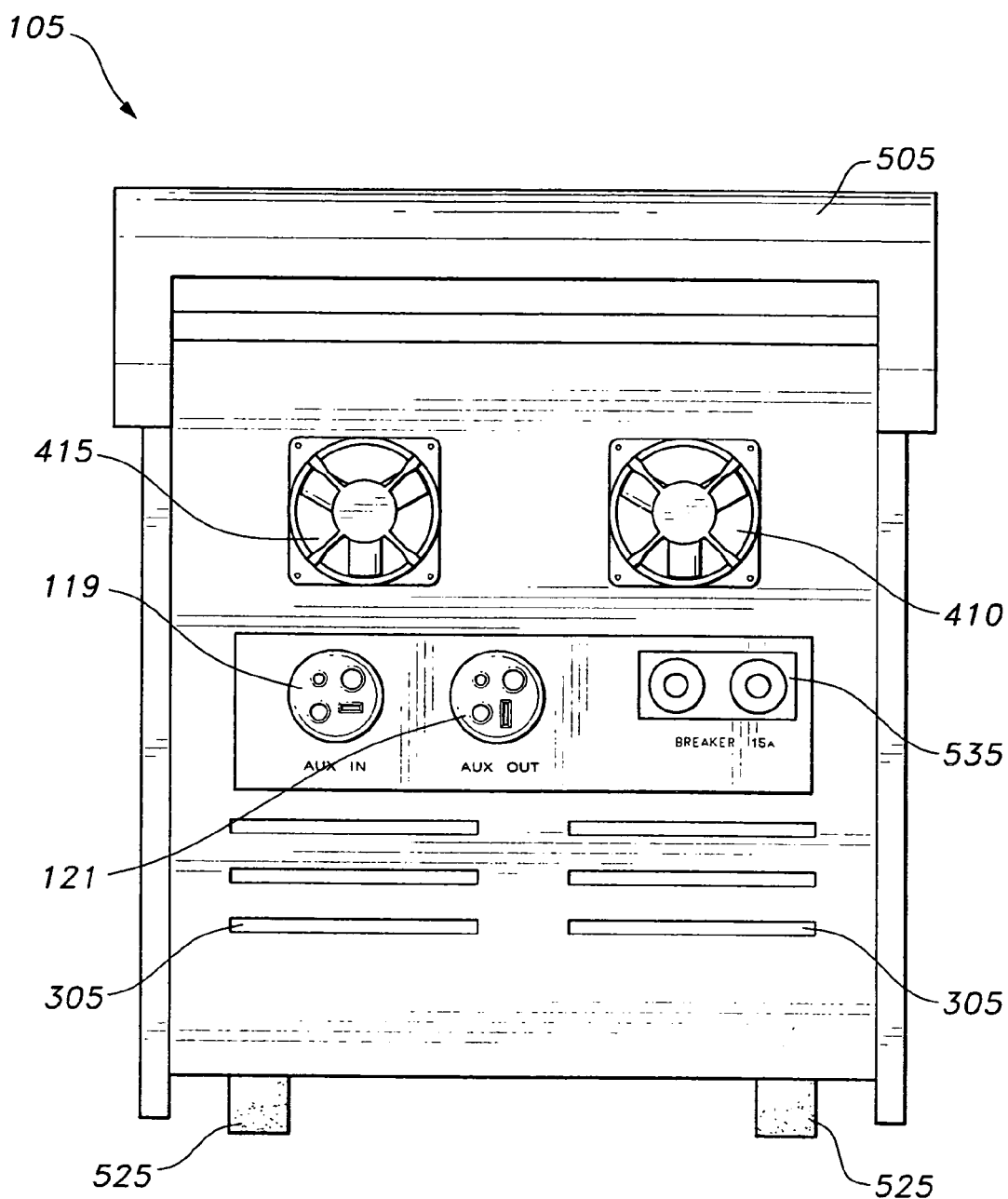
FIG. 5C is a rear view of a non-wheeled, portable version of the electrical energy source, according to the present invention.

As shown in FIG. 5C, AUX IN 119 and AUX OUT 121 receptacles are disposed on the rear panel of the non-wheeled, portable version, according to the present invention. Cooling fan 410, exhaust fan 415, 15 A circuit breakers 535 and ventilation louvers 305 are also disposed on the rear panel of the embodiment shown in FIG. 5C.

Figure 5D:
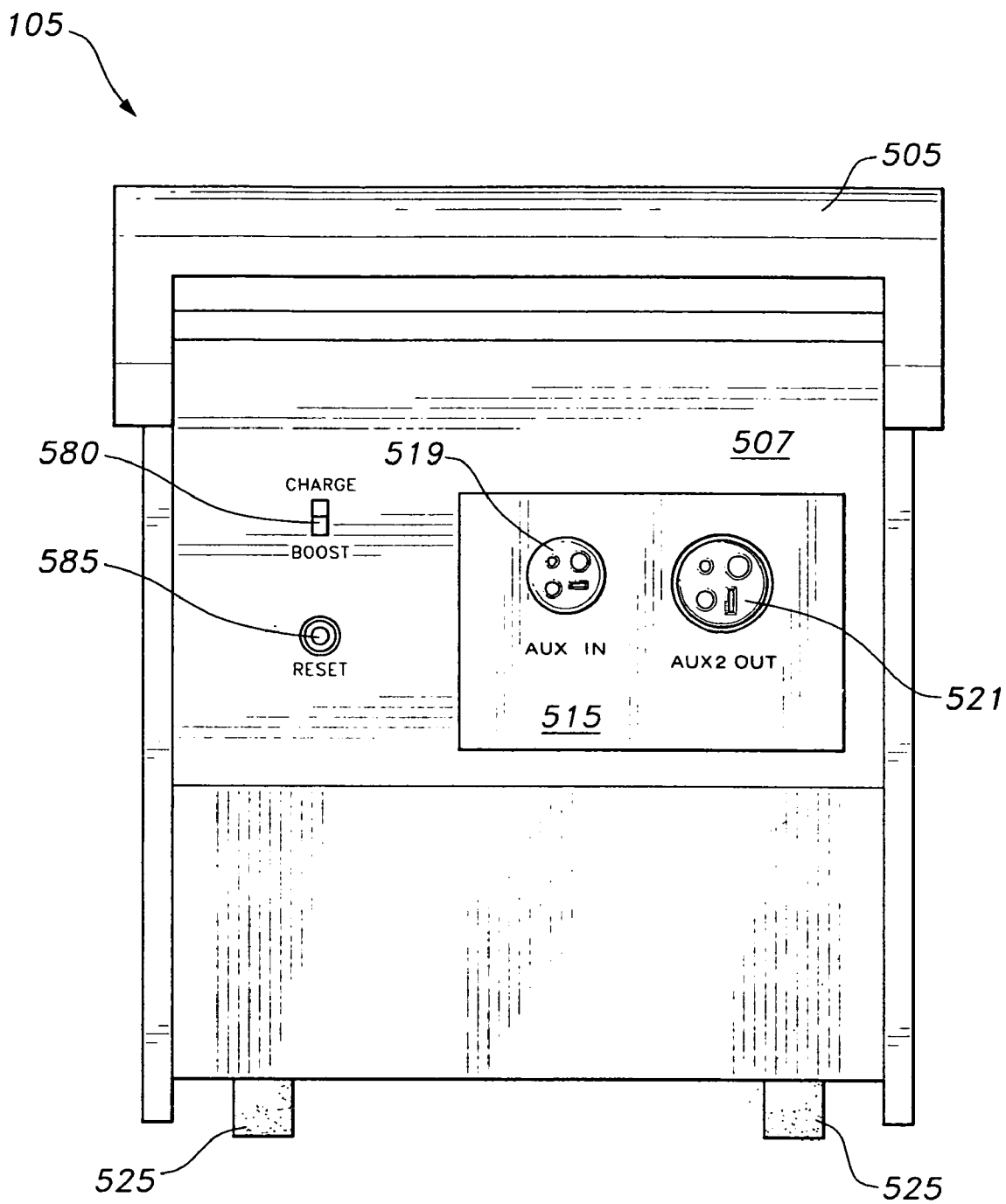
FIG. 5D is a front view of a non-wheeled, portable "battery pack" version of the electrical energy source, according to the present invention.

In the "Battery Pack 24V" embodiment of the present invention, as shown in FIG. 5D, a charge/boost switch 580 is included on front panel 507. Reset button 585 is provided to reset system electronics. Within interface panel 515, an AUX IN port 519 is provided, an AUX2 OUT port 521 is also provided. The entire enclosure is supported by rubber support rests 525.

As shown in FIGS. 12A-12E, the electrical energy source 105 may be provided in an alternative wheeled embodiment 1205. The alternative wheeled embodiment 1205 has a lower profile "open cage" chassis in which the interface panel 1207 and inverter section 1220 are mounted on an upper level of the chassis and the batteries 1210 are mounted on a lower level of the chassis.

Figure 12A:
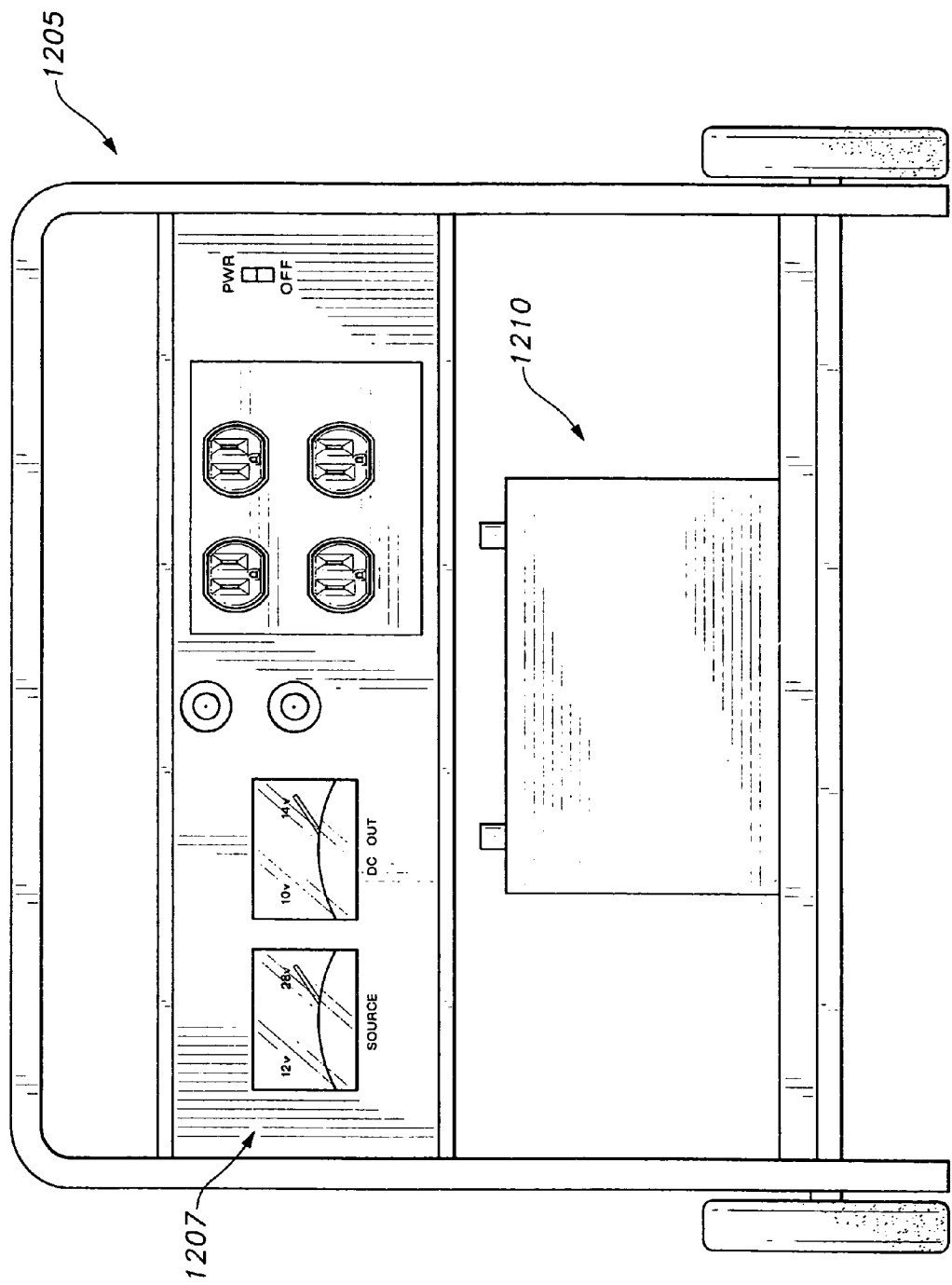
FIG. 12A is a front view of an alternative low-profile wheeled embodiment of the electrical energy source, according to the present invention.
Figure 12B:
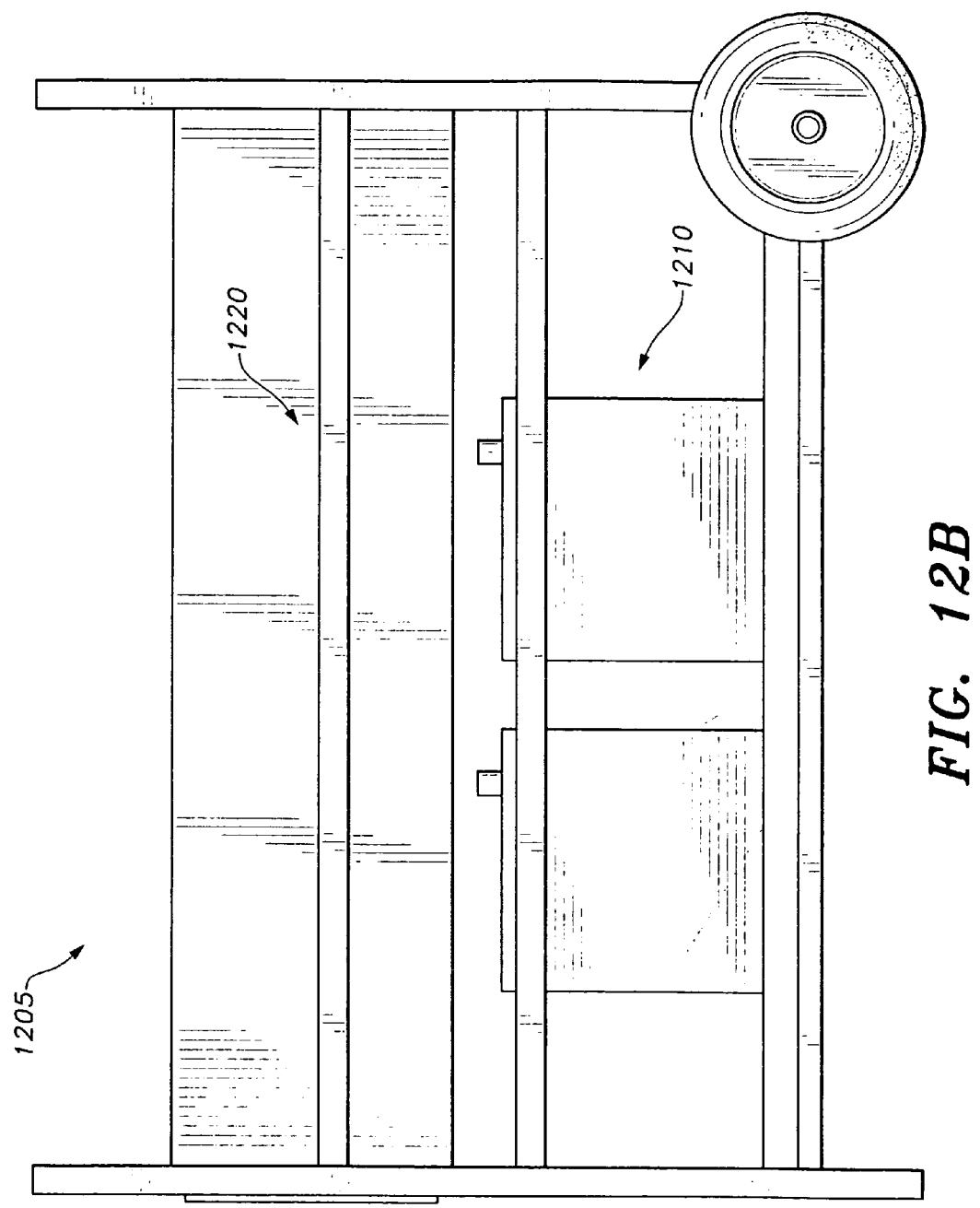
FIG. 12B is a side view of an alternative low-profile wheeled embodiment of the electrical energy source, according to the present invention.
Figure 12C:
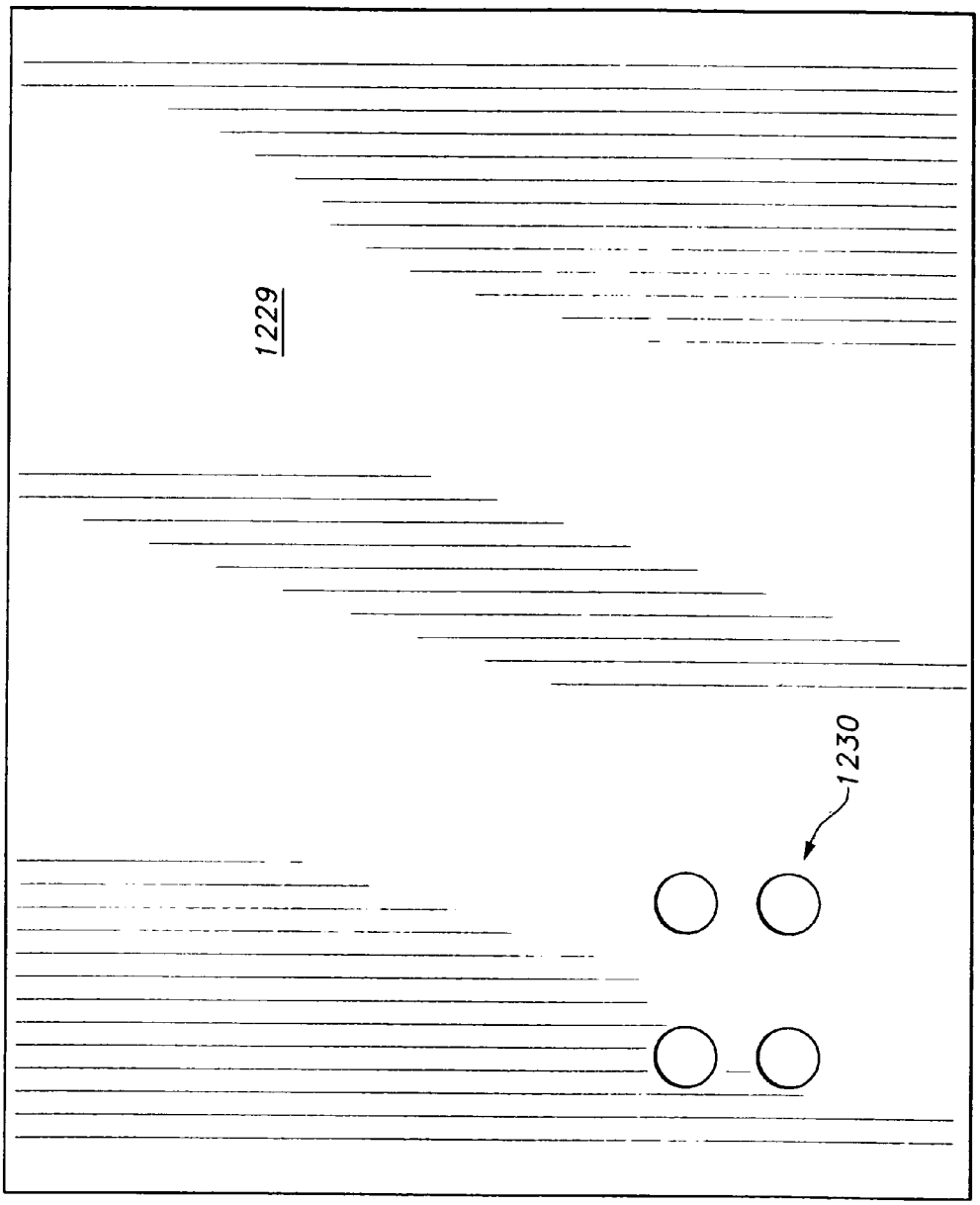
FIG. 12C is a bottom view of an alternative low-profile wheeled embodiment of the electrical energy source, according to the present invention.
Figure 12D:
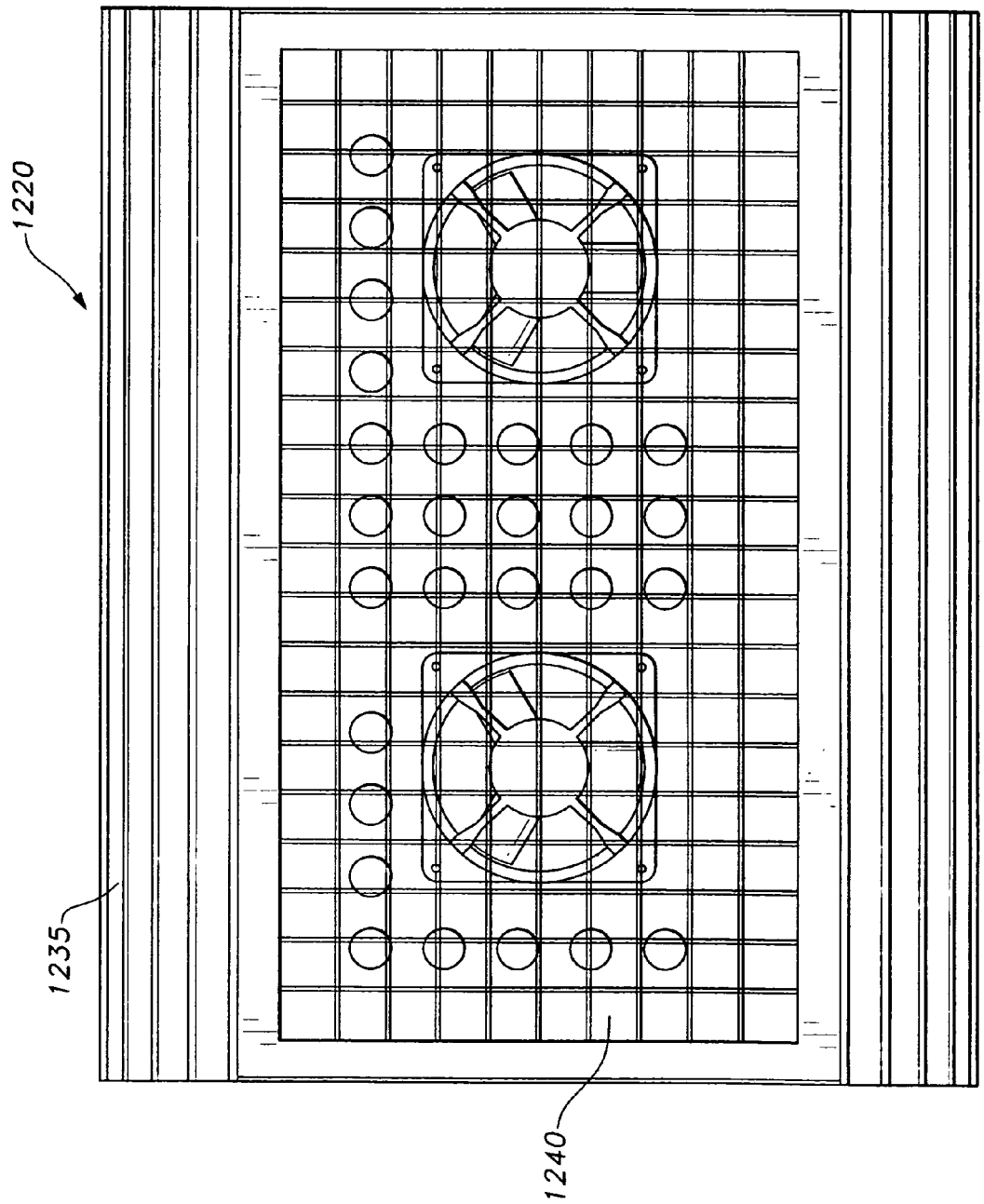
FIG. 12D is a top view of an alternative low-profile wheeled embodiment of the electrical energy source, according to the present invention.
Figure 12E:
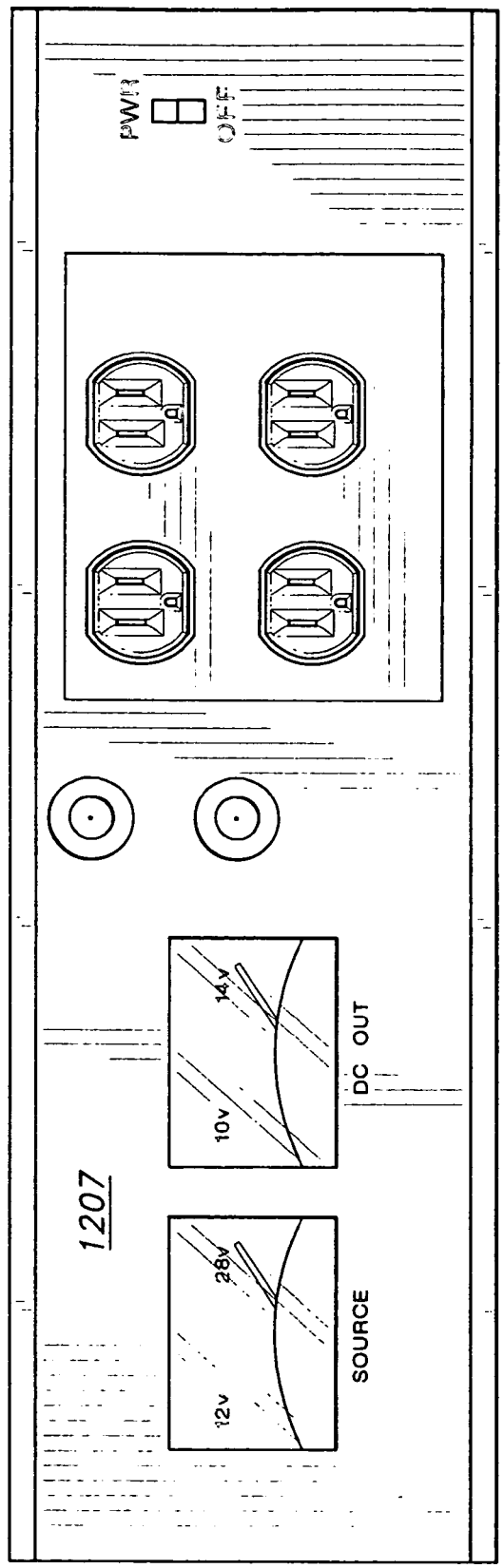
FIG. 12E is a sectional front view of an alternative low-profile wheeled embodiment of the electrical energy source, according to the present invention.

A bottom panel 1229 of the unit 1205 may have cable outlets 1230 for connection to batteries 1210. As shown in top view FIG. 12D, heat sinks 1235 are disposed laterally across the unit inverter section 1205. A mesh guard 1240 is provided to protect cooling fans and power transistors below the guard. Referring to FIGS. 12A and 12E, the interface panel 1207 is disposed laterally across the unit 1205 to provide easy access to electrical monitoring, switches, fuses and I/O sockets.

Figure 6A:
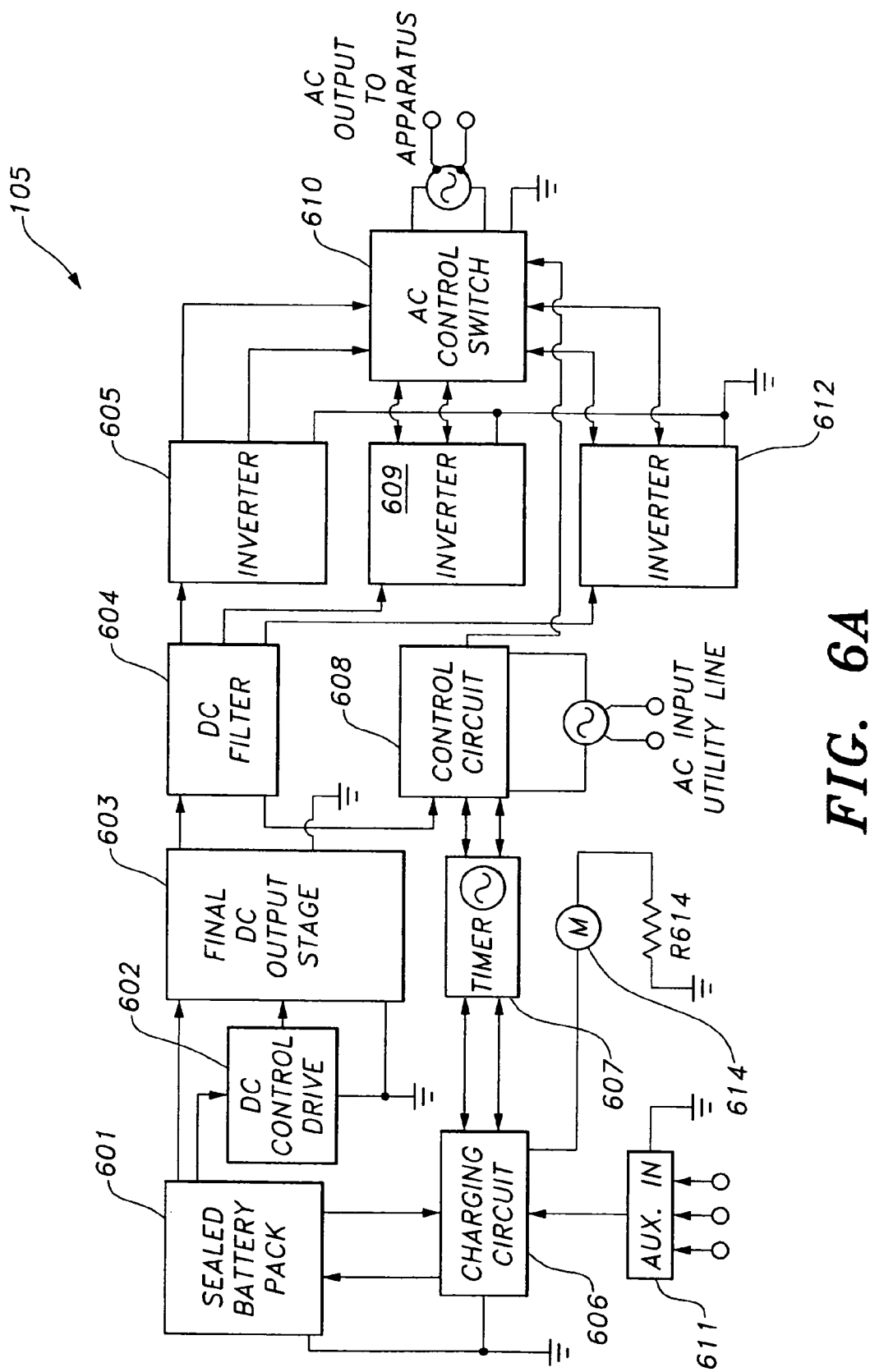
FIG. 6A is a block diagrammatic view of the electrical energy source, according to the present invention.
Figure 6B:
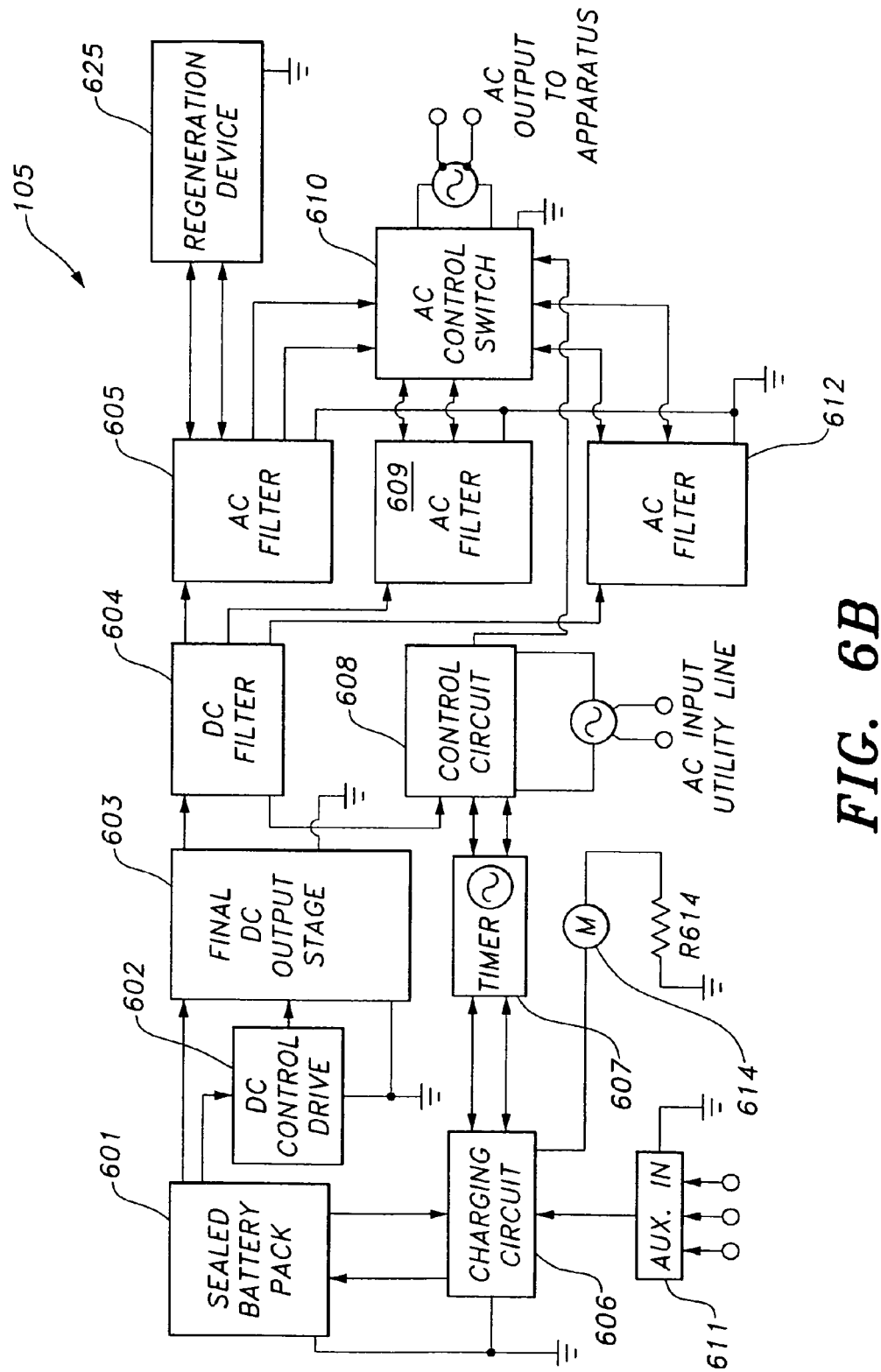
FIG. 6B is a block diagrammatic view of the electrical energy source including regeneration apparatus, according to the present invention.
Figure 6C:
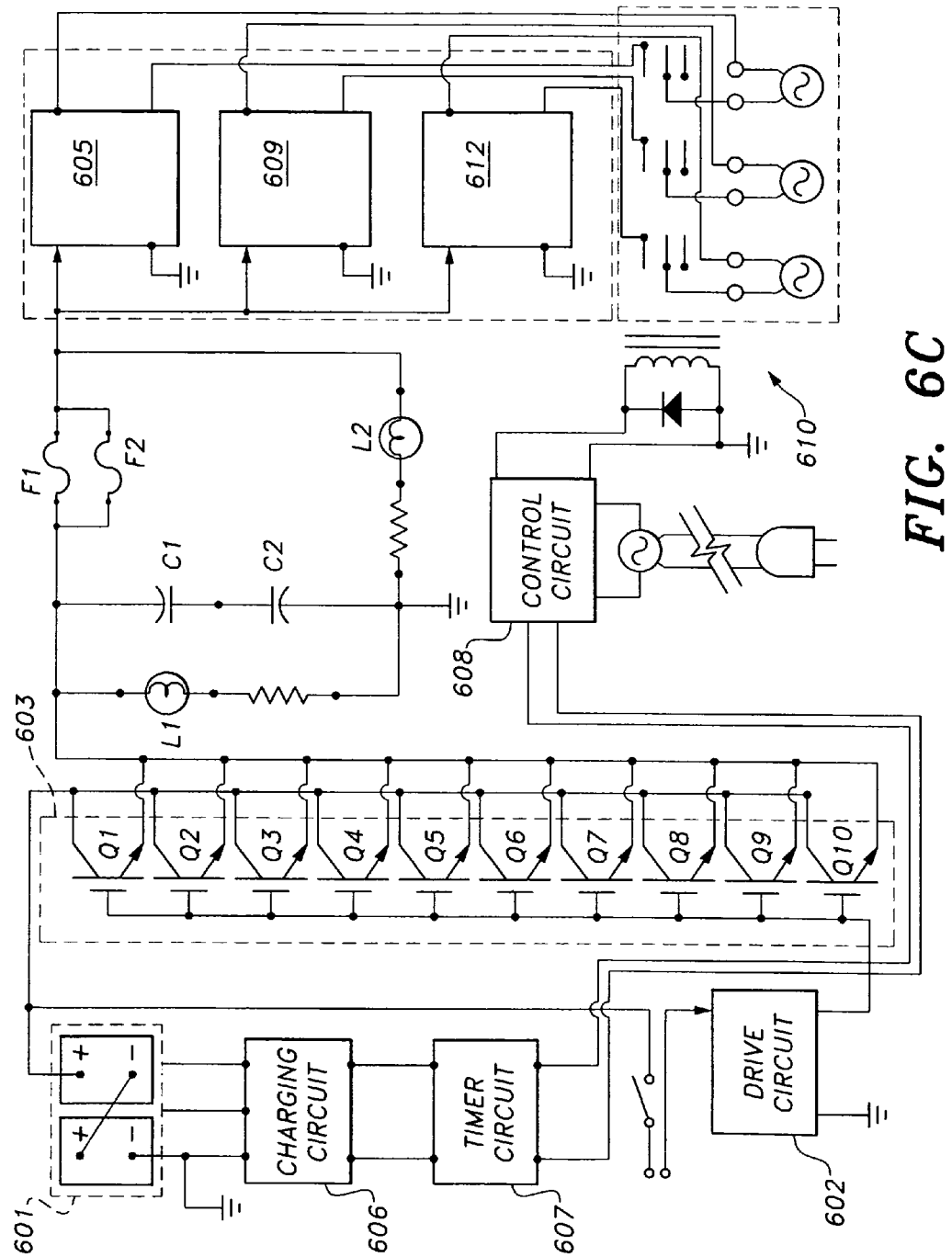
FIG. 6C is a block diagrammatic/schematic view of the electrical energy source, according to the present invention.

As shown in FIGS. 6A-6C, at least one sealed battery pack 601 is used as an input power source. The battery pack 601 preferably comprises 12.5 V DC batteries within the pack 601 wired in series to provide approximately 25 VDC. Current capacity may be added by wiring additional series configured 12.5 VDC batteries in parallel with the pack shown in FIG. 6C. Preferably, individual batteries of the pack 601 may be comprised of spiral celled batteries. The battery pack 601 has outputs to a final DC output stage 603. DC output stage 603 preferably comprises an array, i.e., plurality Q1-Q10 of Insulated Gate Bipolar Transistors (IGBT array) in order to provide a high current controlling capability along with the capability to limit, i.e., regulate the DC output voltage to a voltage that is compatible with subsequent stages of the system 105, e.g., 12.5-14 VDC. For example, a 3 KW system 105 using the final DC output stage 603 can provide approximately 580 amperes for use by subsequent stages of the system 105.

Figure 6D:
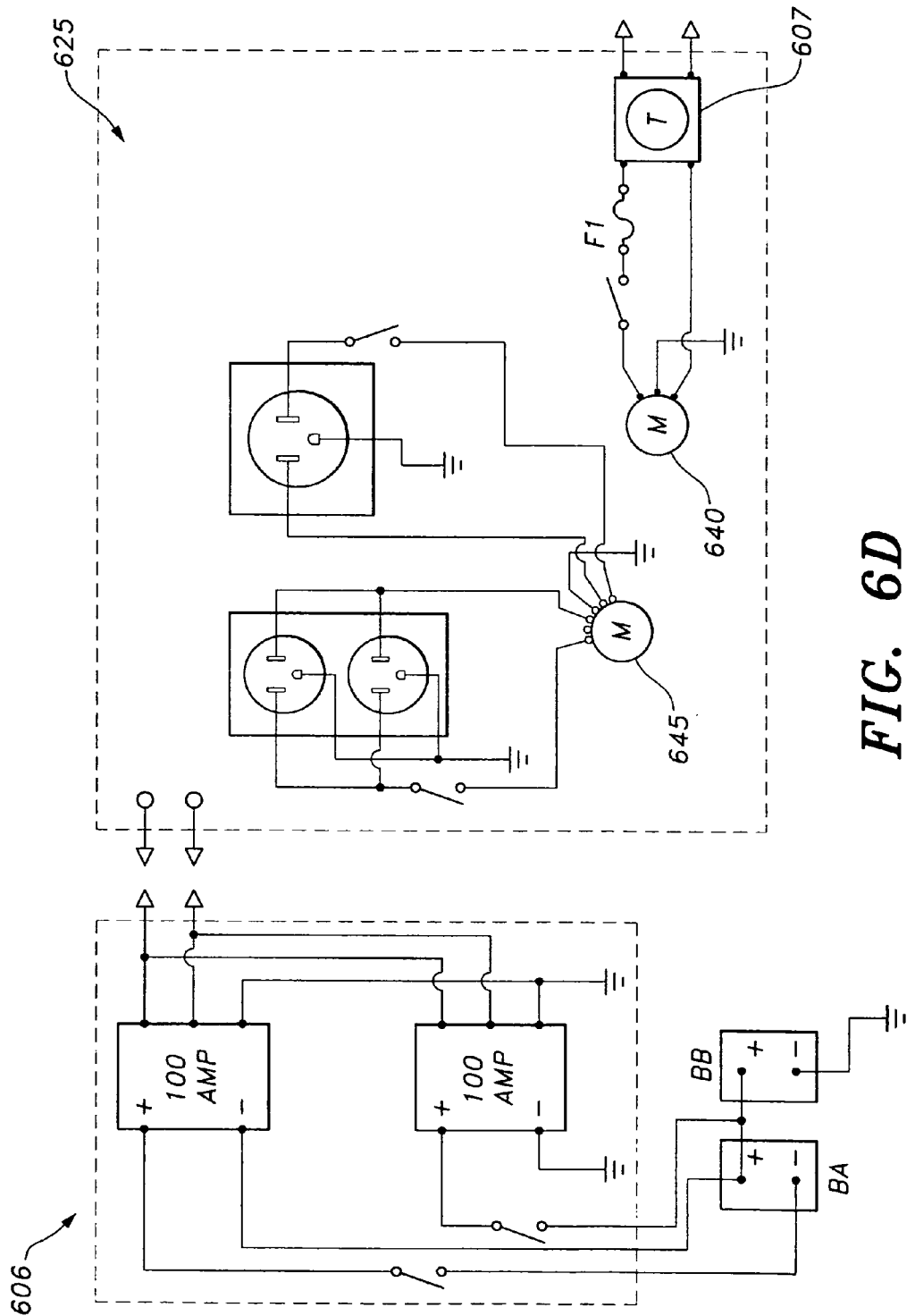
FIG. 6D is a schematic view of the charging/regeneration circuit of the electrical energy source, according to the present invention.
Figure 6E:
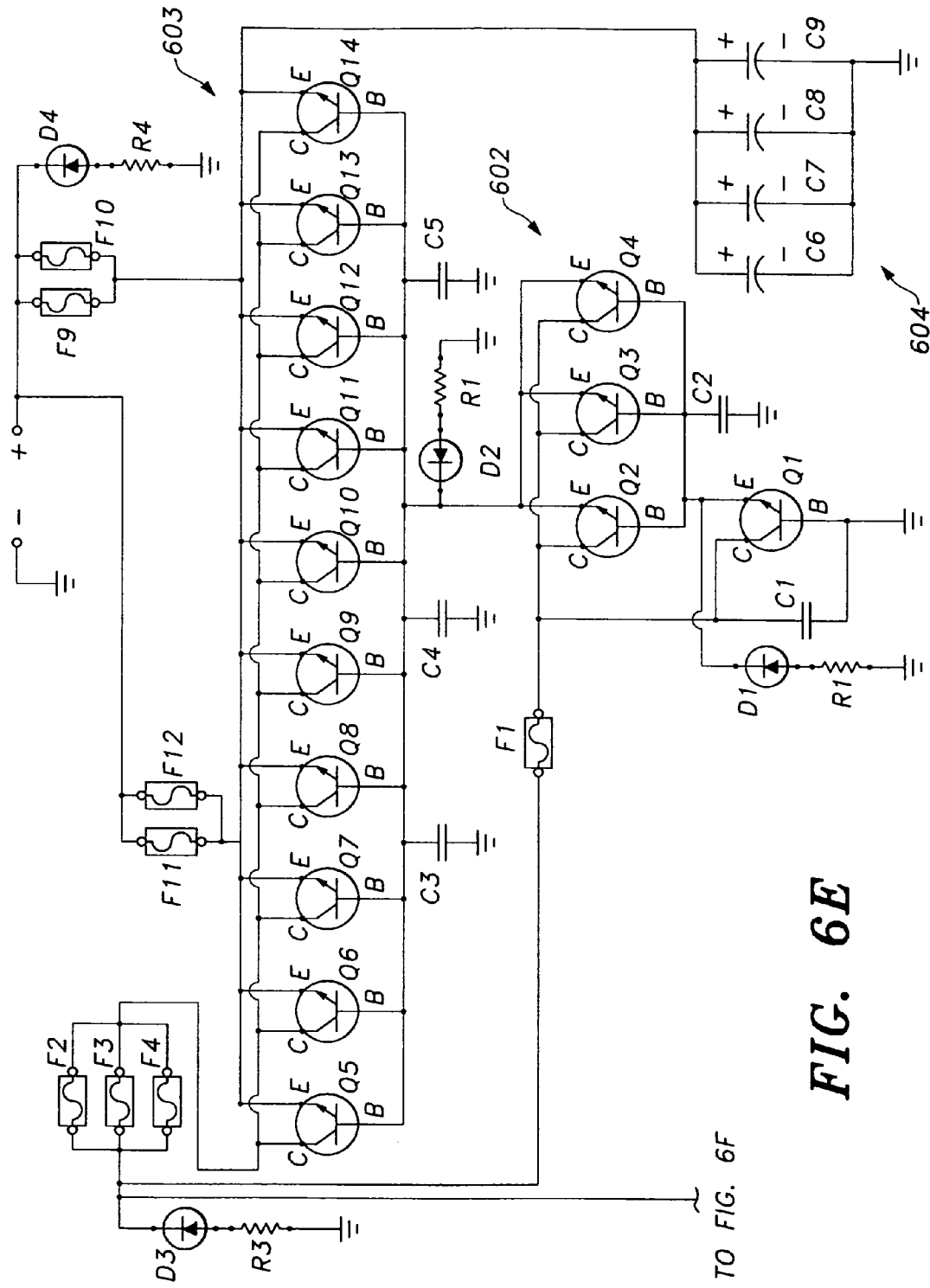
FIGS. 6E-6F are a schematic diagram of electrical energy source according to the present invention.

As shown in FIG. 6E, output stage 603 may use ordinary, e.g., 2N5055, high speed switching transistors Q2, Q6, Q7 Q8, Q9, Q10, Q11, Q12, Q13, Q14, instead of the aforementioned IGBT array. Additionally, DC filter 604 may comprise parallel electrolytic capacitors C6-C9, each capacitor having approximately 36,000 MFD and rated at approximately 35 volts DC. Moreover, one of the output lines to the Final DC output stage 603 has an intervening electrical connection to DC control drive, i.e., DC driver circuit 602 which in turn has an electrical output to the final DC output stage 603. DC control drive 602 provides voltage regulation at the output of final DC output stage 603. As shown in FIG. 9, DC control drive 602 may comprise a Darlington pair of transistors, such as Q1 and Q2, having a set-point determined by potentiometer R12. Alternatively a voltage regulator module, such as e.g., an LM 7812, may be used to accomplish the voltage regulation function of DC control drive 602. Additionally there is a bi-directional electrical interface between the battery pack 601 and a charging circuit 606.

The charging circuit 606 has at least one bi-directional electrical interface to a timer 607. Additionally, an ammeter 614 may be connected between the charging circuit 606 and a series resistor R614 to ground in order to provide monitoring capability of the charging process. Auxiliary input port 611 has an output that is electrically connected to the charging circuit 606. Charging voltage from auxiliary sources such as solar power generators, automotive/marine power sources, and the like may be provided by a connection to auxiliary input port 611.

Figure 6F:
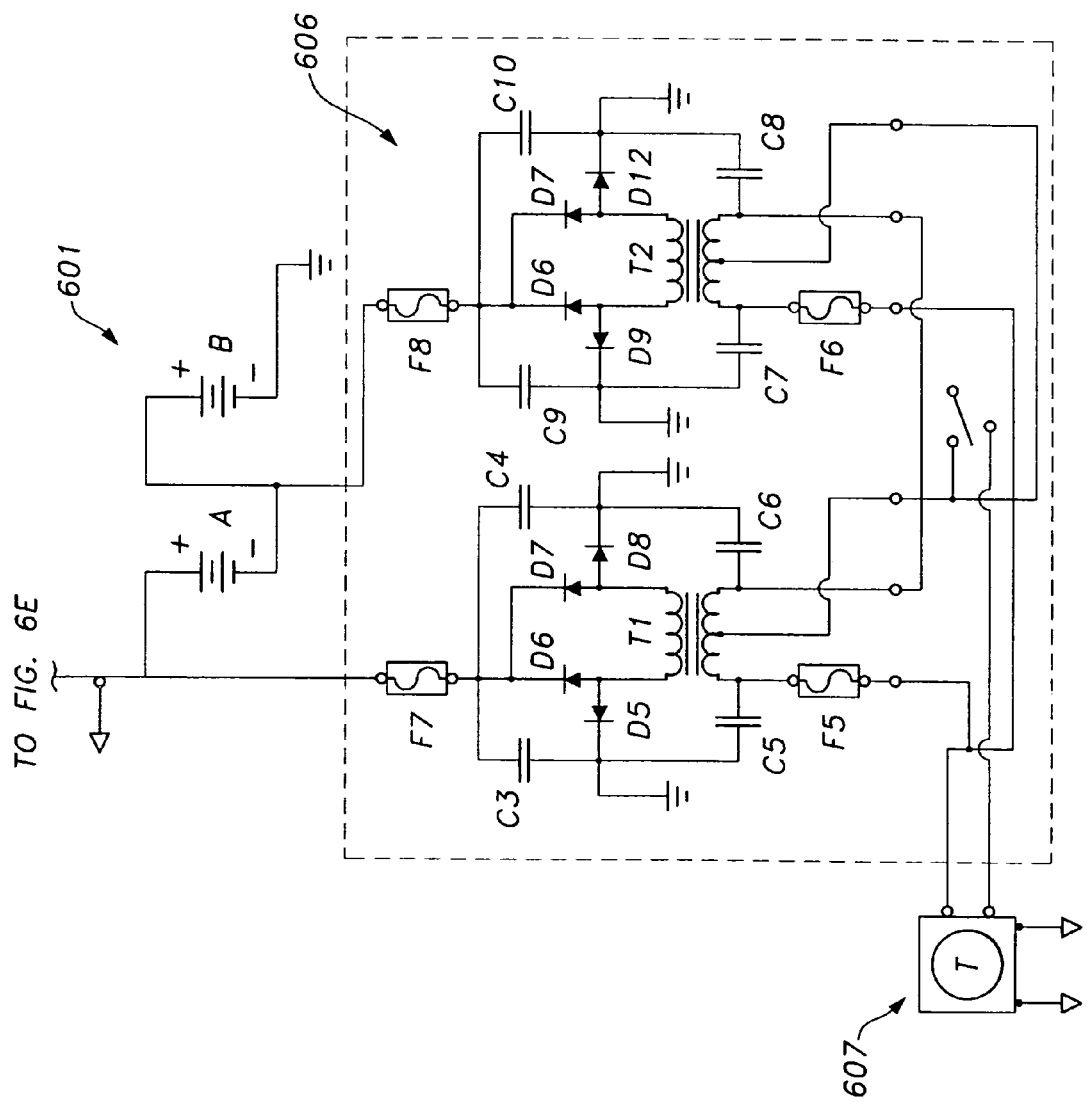

As shown in FIG. 6E-6F, the charging circuit 606 may comprise a plurality of half-wave bridge rectifier modules having center-tap transformer primary windings and that can produce approximately 14.7 volts DC each. Diodes D5-D12 in the bridge rectifiers may have a 1 KV, 50 A capacity. The transformers T1-T2 may have a 110 V AC primary and a 35 A 13.8 volt secondary.

Charger input may be fused with, e.g., fuses F5 and F6, each having a 20 A current rating. Charging circuit 606 may be provided with a low voltage input and a high voltage input. The low voltage input is activated by switching the 110 VAC input from end-to-end primary leads to end-to center-tap primary leads of transformers T1 and T2. Charger output may also be fused with, e.g., fuses F7 and F8 which are shown to each have a 60 A current rating. The current capacity of the charging circuit 606 allows for faster recovery time while charging the battery packs 601. AC input to the charging circuit 606 is switched by the timer 607.

Timer 607 has at least one bi-directional electrical interface to control circuit 608. The control circuit 608 has an AC input from a public utility line. Additionally, the control circuit 608 has an input from the DC filter 604. The final DC output stage 603 has an electrical output to the DC filter 604. Thus, operational conditions of the DC filter 604 when being subject to output voltage from the final DC output stage 603 may be monitored by the control circuit 608 in order to determine when charging circuit 606 should be activated under timing control of timer 607 to charge battery pack 601.

As shown in FIG. 6C, the DC filter 604 can include capacitors C1 and C2 in parallel with filament resistance of lamp L1 in series with filter resistance R1 in order to provide a sufficient RC time constant that can smooth any transient output from DC output stage 603. Fuses F1 and F2 protect the system 105 from any over-voltages that may be developed at the output of DC filter 604. Lamp L2 is provided for a visual verification that a voltage is present at output of DC filter 604.

The DC filter 604 output is electrically connected, i.e., routed to inputs of AC inverter/filters, 605, 609, 612. At least one of the inverter/filters 605, 609, 612 may have a bi-directional electrical connection between an inverter/filter output and an input of an AC control switch 610. A plurality of outputs of the AC control switch 610 supply AC output voltage to a plurality of loads, i.e., devices to be operated, such as appliances, lights, computers, air conditioners, televisions, shop lights, hand drills, power saws, office equipment, and the like. DC output stage 603 can make up to 580 amperes or more available to the AC inverters/filters 605, 609, and 612. Due to the high current output of the electric power source 105, many of the aforementioned appliances and equipment can run simultaneously under power supplied by the power source 105. AC inverters/filters 605, 609, 612 may be off-the-shelf commercially available units having adequate ventilation and capable of providing AC voltage in the 110-120 V range when supplied with the regulated DC voltage provided by final DC output stage 603.

Figure 10:
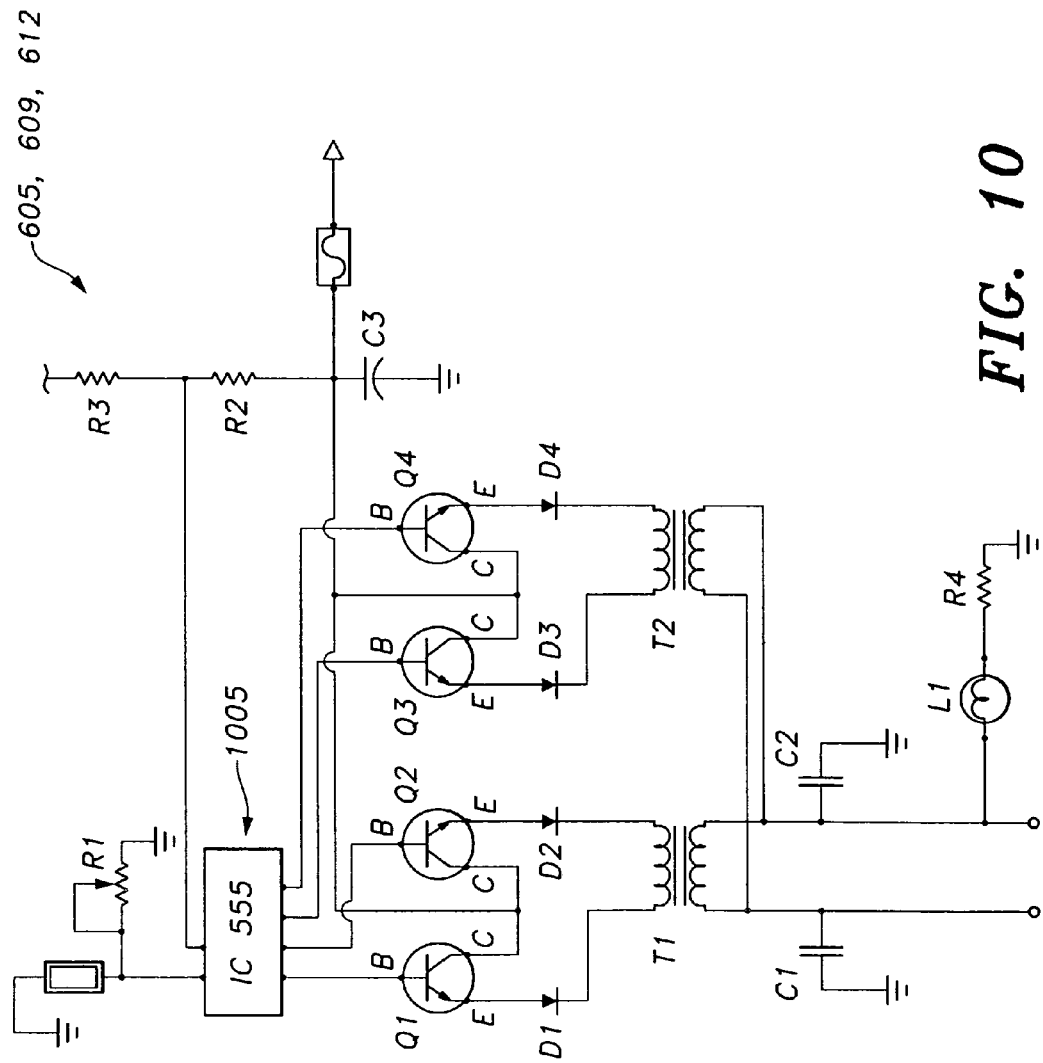
FIG. 10 is a schematic view of the inverter section of the electrical energy source, according to the present invention.
Figure 11A:
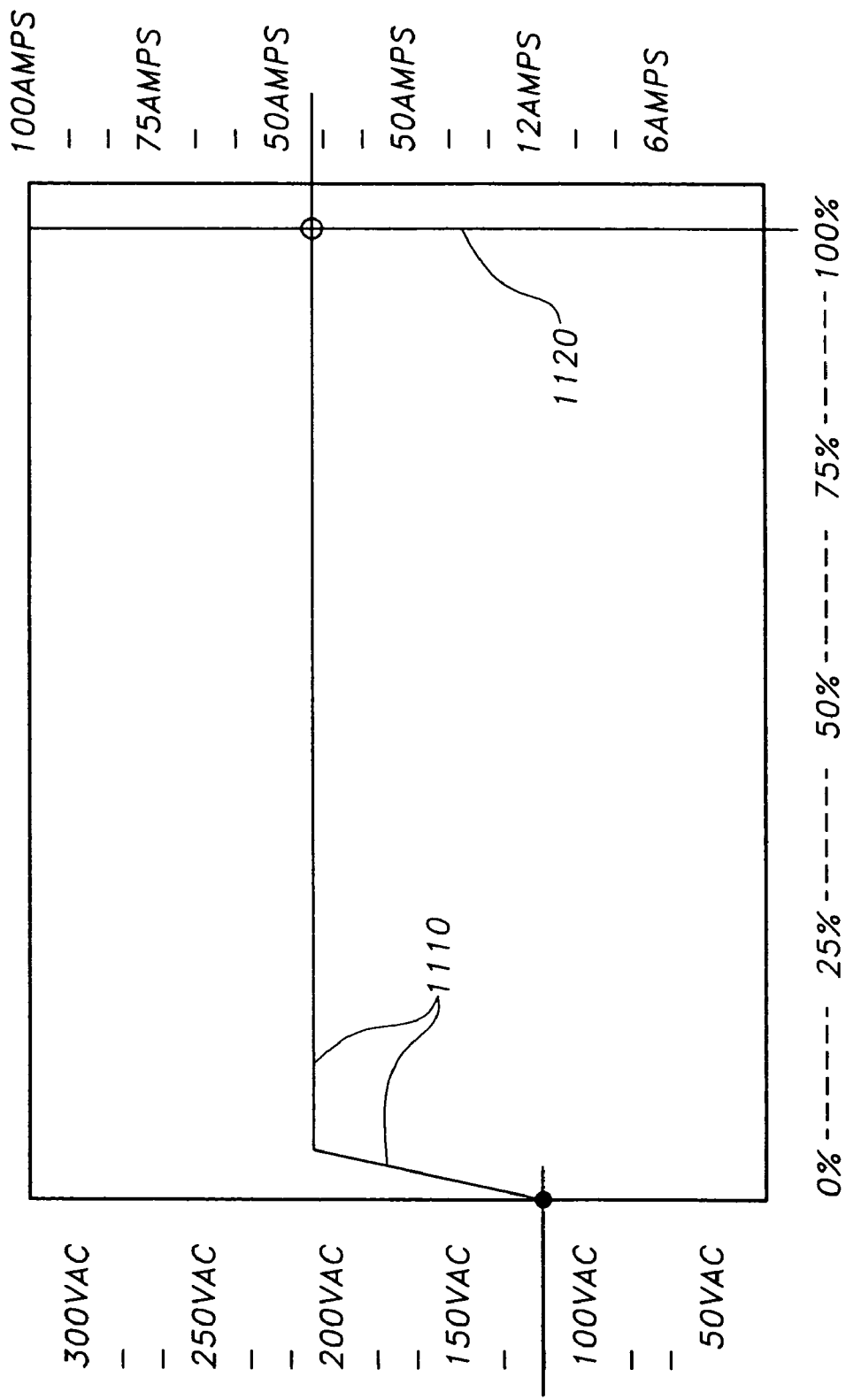
FIG. 11A is a graphical load line diagram of the electrical energy source out of service from the utility service, according to the present invention.
Figure 11B:
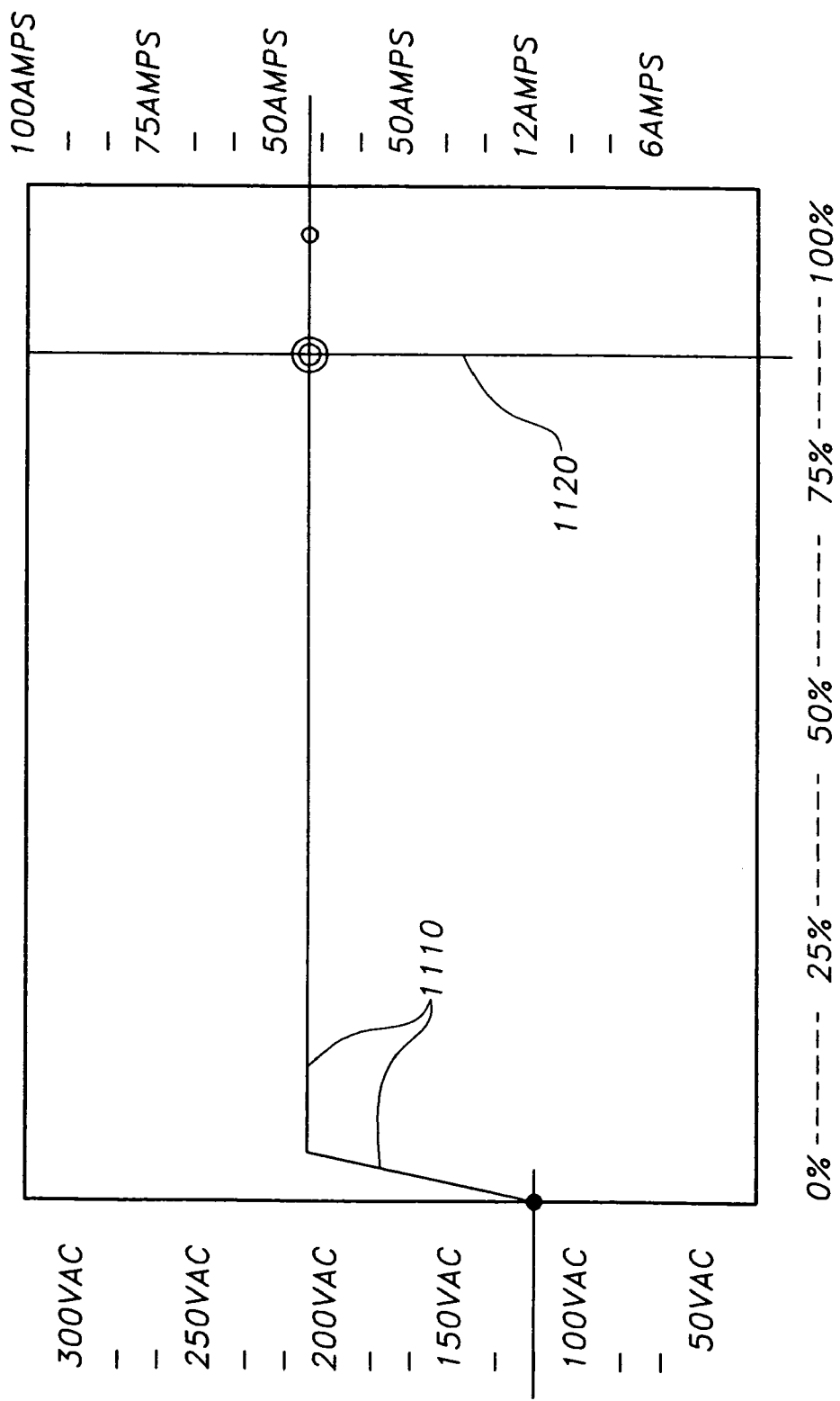
FIG. 11B is a graphical load line diagram of the electrical energy source in service without utility service, according to the present invention.
Figure 11C:
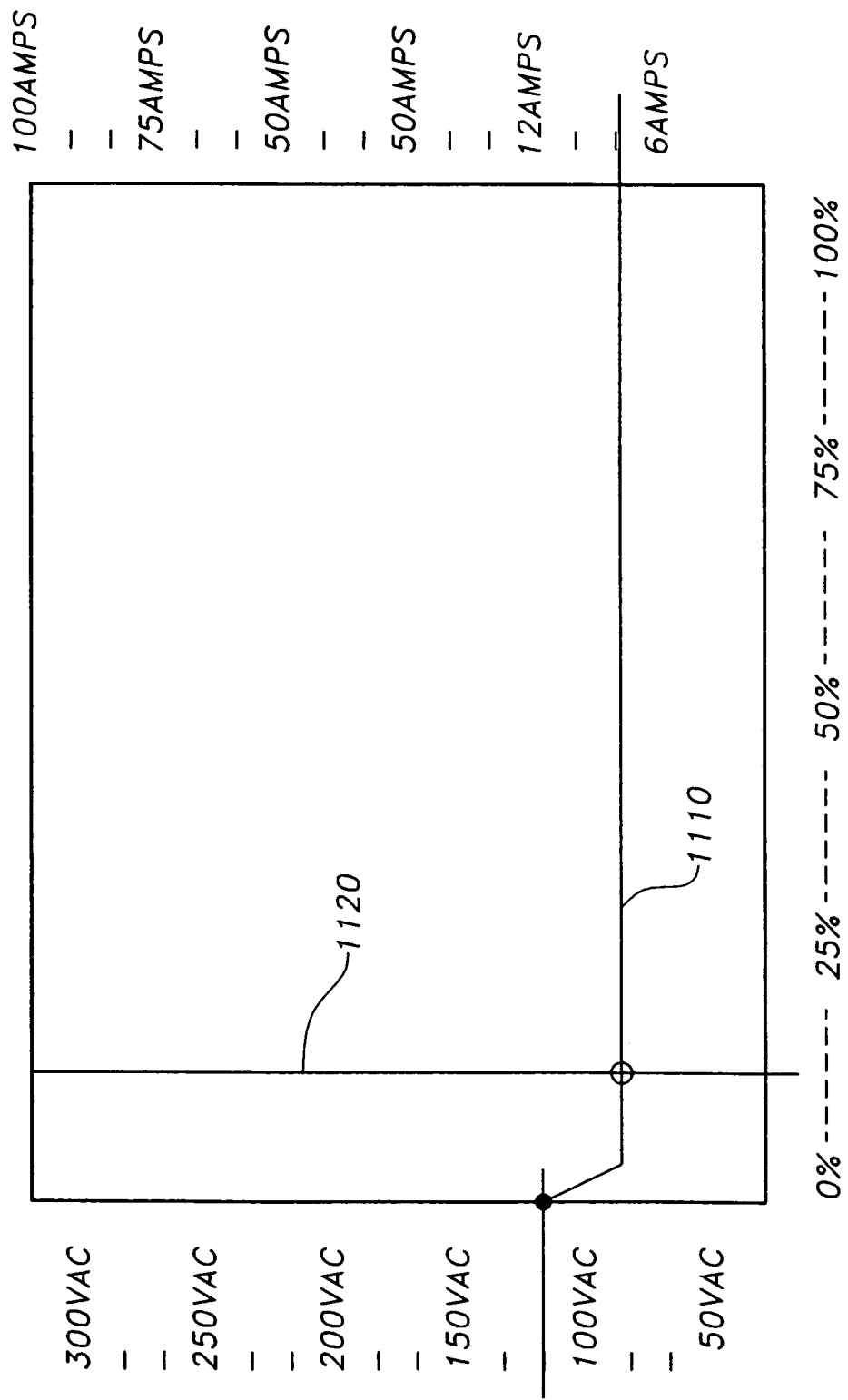
FIG. 11C is a graphical load line diagram of the electrical energy source in service while using utility service for charging, according to the present invention.
Figure 11D:
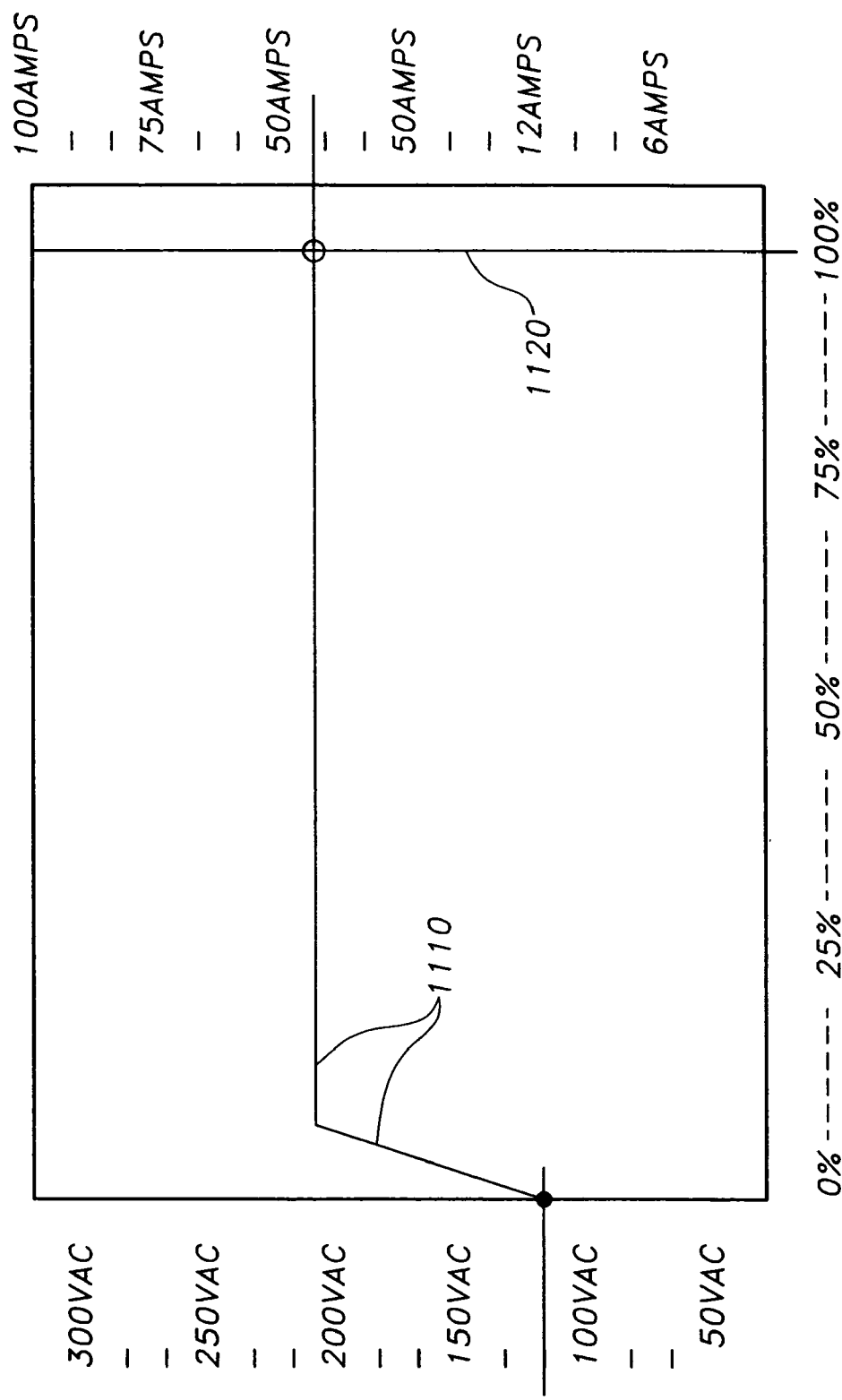
FIG. 11D is a graphical load line diagram of the electrical energy source during portable operations without any utility service, according to the present invention.

Alternatively, inverter stages 605, 609, and 612 can be built up, utilizing the design shown in FIG. 10. Both off-the-shelf and custom designs of the inverter/filters are preferably capable of providing a pure sine wave output for compatibility with a wide variety of loads. According to the present invention, voltage output from final DC output stage 603 to primary windings of transformers T1, T2, and the like, may be converted to pulses by switching action of a crystal controlled timing circuit 1005, such as the crystal controlled timer IC 555 in operable communication with power switching transistors Q1-Q4 shown in FIG. 10.

Moreover, in the embodiment shown in FIG. 10, transformers T1, T2, and the like, have a 12 VDC primary with center-tap, and a 110 VAC secondary. Capacitors C1, C2 are preferably 0.001 uF and rated at 1 KV. Capacitor C3 is 3600 MFD and rated at 35 VDC. Lamp L1 is a 110 VAC pilot lamp for AC output indication. Transistors Q1-Q4 are preferably 2N3055 or equivalent.

Diodes D1-D4 are 50 A, 1 KV rated. Resistor R1 is a 10 KΩ potentiometer and rated at 2 Watts. Resistor R2 is 10 KΩ and rated at 2 Watts. Resistor R3 is 45Ω and rated at 2 Watts. Clock crystal is approximately 200 Mhz. The inverter shown may provide approximately 400 W output. Identically configured stages, such as the aforementioned described inverter shown in FIG. 10, may be added to provide additional power output.

As shown in FIG. 6C, the AC control switch 610 comprises a single pole double throw (SPDT) relay of which one half of the switching circuit is utilized (only one pole is connected to inverter outputs). The relay coil of control switch 610 is energized by the control circuit 608 when power from the energy source 105 is ready to be delivered to the load.

Additionally, as shown in FIG. 6B, at least one AC inverter/filter 605 may have a bi-directional electrical connection to a regeneration device 625. The regeneration device 625, which may comprise, inter alia, e.g., an AC generator or an AC alternator, has a plurality of electrical connections to the bi-directional connection between the timer 607 and the control circuit 608.

Figure 7A:
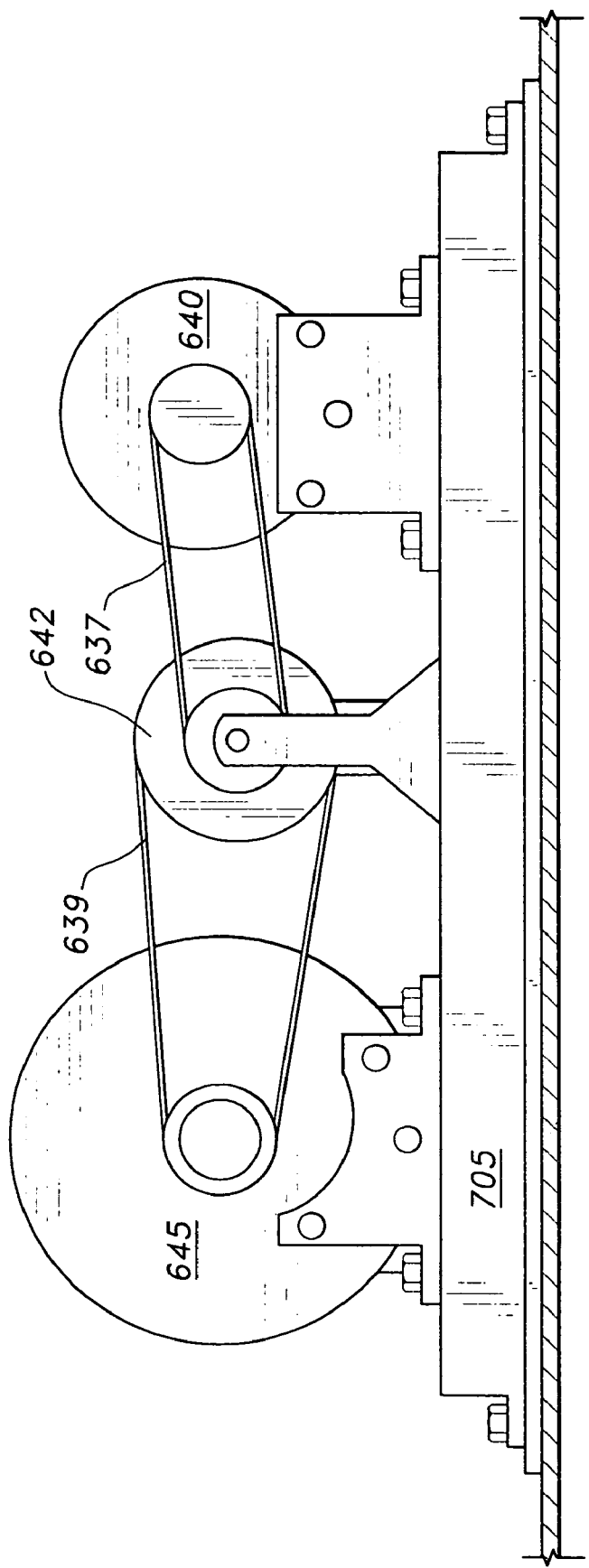
FIG. 7A is a front view of the regeneration assembly, according to the present invention.
Figure 7B:
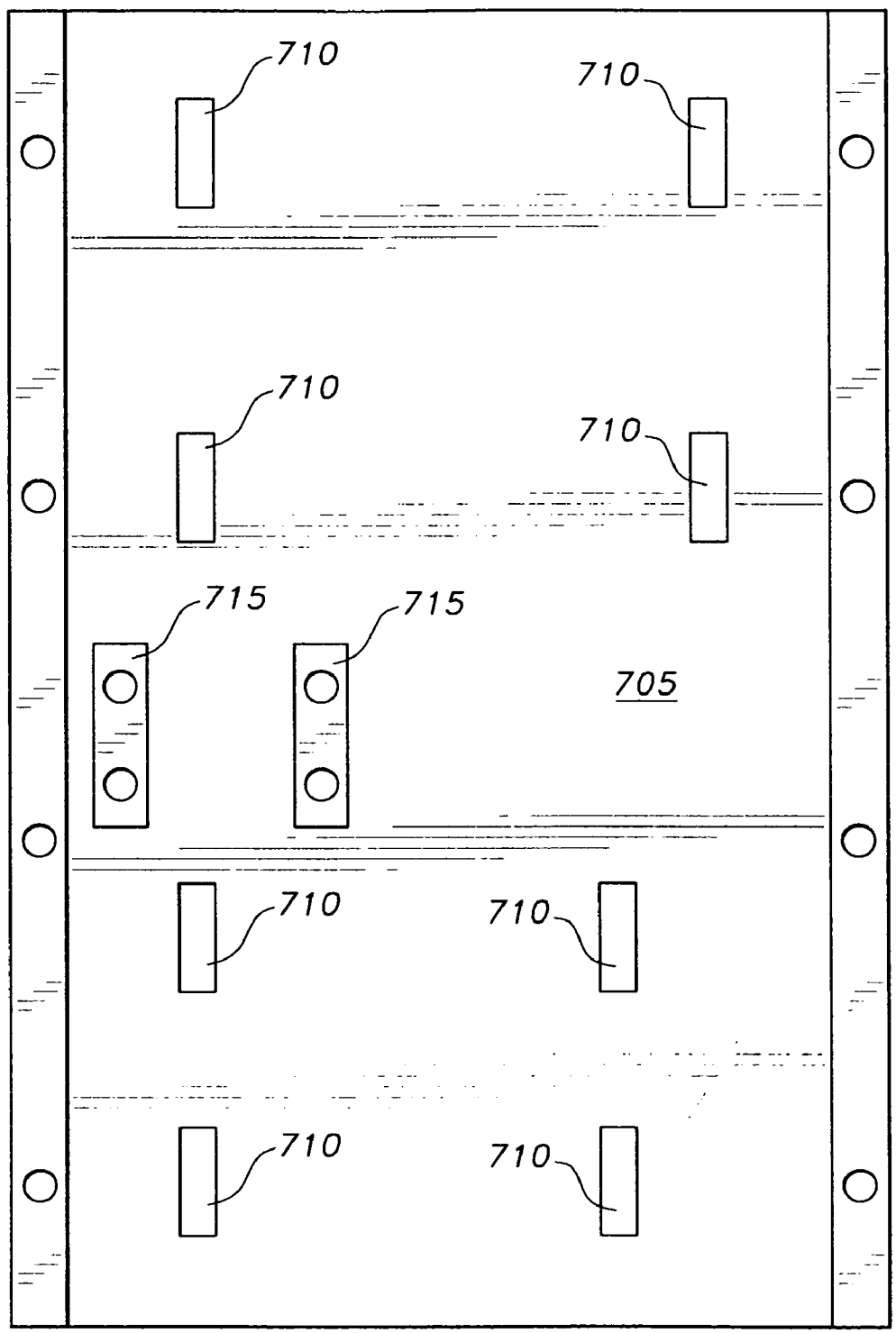
FIG. 7B is a top view of the regeneration assembly platform, according to the present invention.

When directed by the control circuit 608 (such as, e.g., when a predetermined low inverter output voltage threshold has been reached), the regeneration device 625 can feed battery charging current to the battery pack 601 via timer 607 and charging circuit 606 at the same time control circuit 608 commands the AC control switch 610 to remove inverter power from the load. As shown in FIGS. 7A-7B, components of the regeneration device 625 are mounted on a stable base plate 705 via mounting slots 710 and 715. Components of the regeneration device 625 may comprise a 110 VAC electric drive motor 640 having a mechanical output that is connected via belt 637 to a reduction gear set/sheave set 642. A 110-120 V AC power generator 645 has a rotor that is connected via belt 639 to a high torque output of gear set/sheave set 642.

Preferably, as shown in FIG. 7A, the ratio of the sheave diameters may be 4:1, the larger sheave being connected to the power generator 645 in order to provide a torque mechanical advantage. As shown in FIG. 6D, electrical output (110-120 VAC) of the generator 645 is connected to charging circuit 606. As shown in FIGS. 6B and 6D, 110-120 VAC from the inverter/filter 605 is applied to power up the drive motor 640. As the drive motor 640 rotates, increased torque is applied through the gear set/sheave set 642 to cause the power generator 645 to rotate, which produces voltage required by the charging circuit 606 to recharge the battery pack 601.

Preferably, the mechanical advantage provided by gear set/sheave set 642 allows drive motor 640 to operate while demanding substantially less current from inverter/filter 605 than the battery pack charging current produced by power generator 645 in combination with charging circuit 606. A preferable rotational speed of the drive motor drive shaft is approximately 1,700 RPM. A preferable rotational speed of the power generator drive shaft is approximately 2,200 RPM.

The aforementioned RPM speeds are exemplary only, and it should be understood that preferable RPM speeds of both drive motor 640 and power generator 645 may vary depending on the electromechanical characteristics of the drive motor 640 and power generator 645, as well as the specific mechanical configuration of gear set/sheave set 642.

Figure 8:
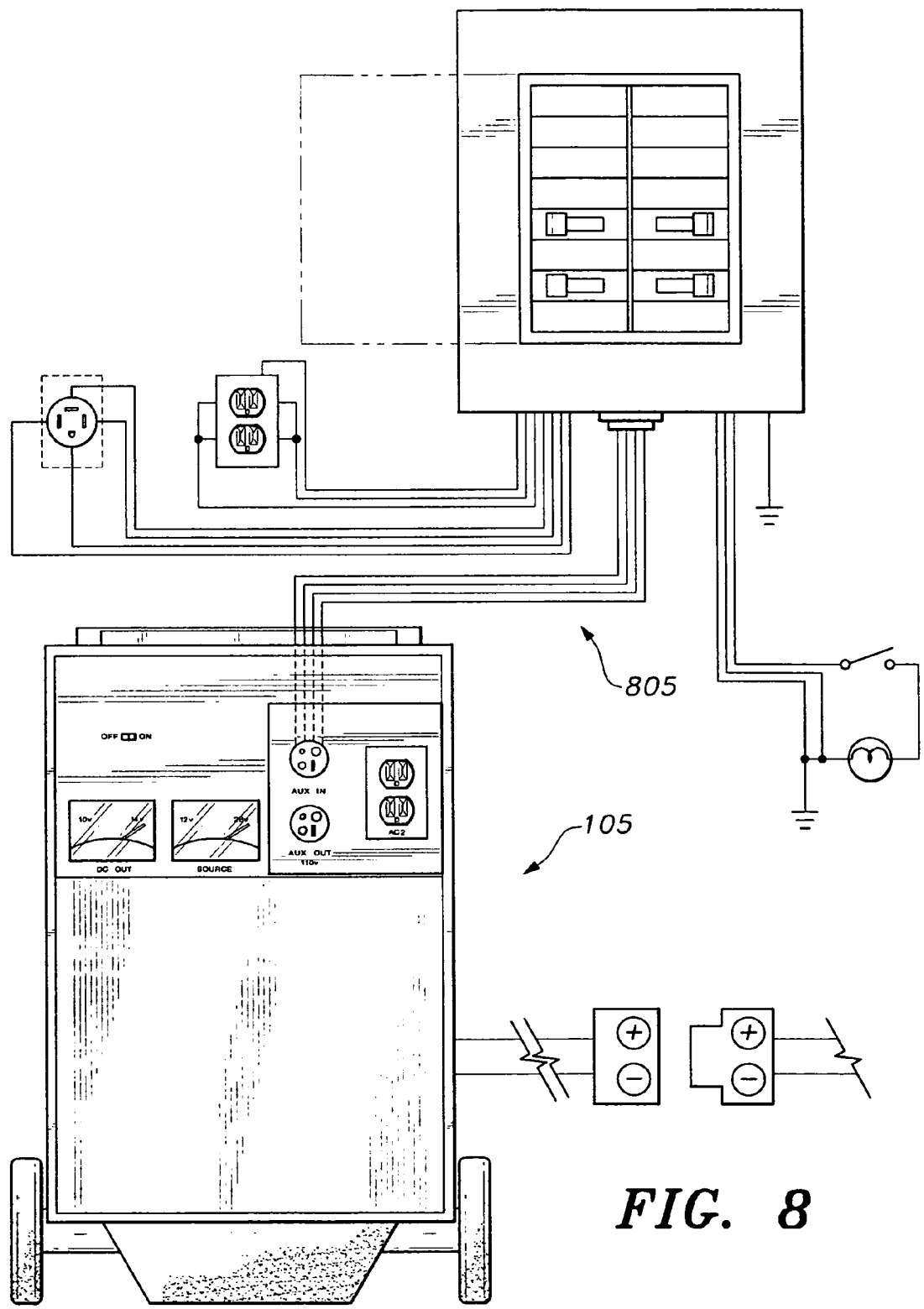
FIG. 8 is a diagrammatic view of the electrical energy source with interface cable to a residential fuse panel, according to the present invention.
Figure 9A:
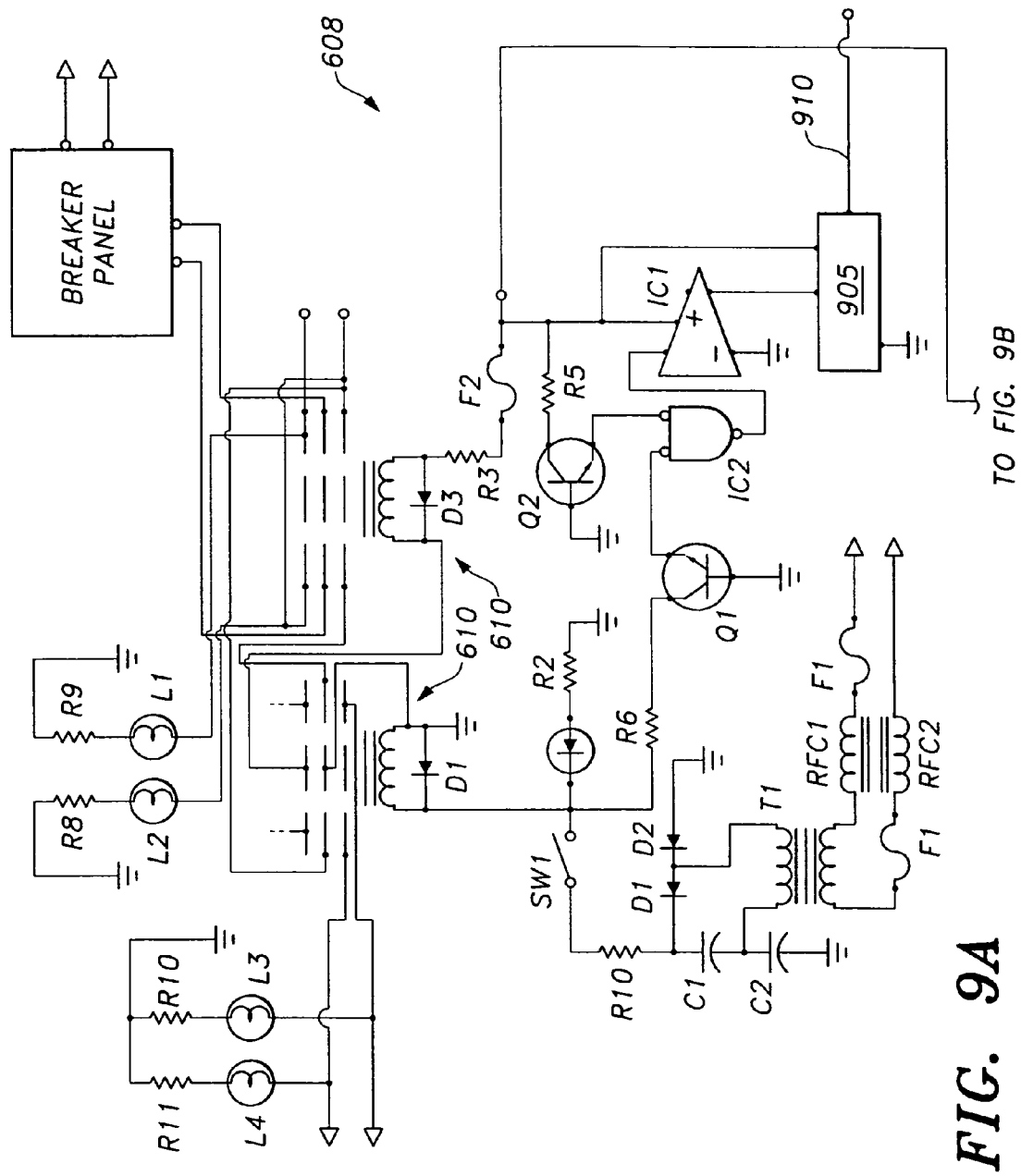
FIG. 9A is a schematic view of the of the electrical energy source connected to a house wiring breaker panel, according to the present invention.
Figure 9B:
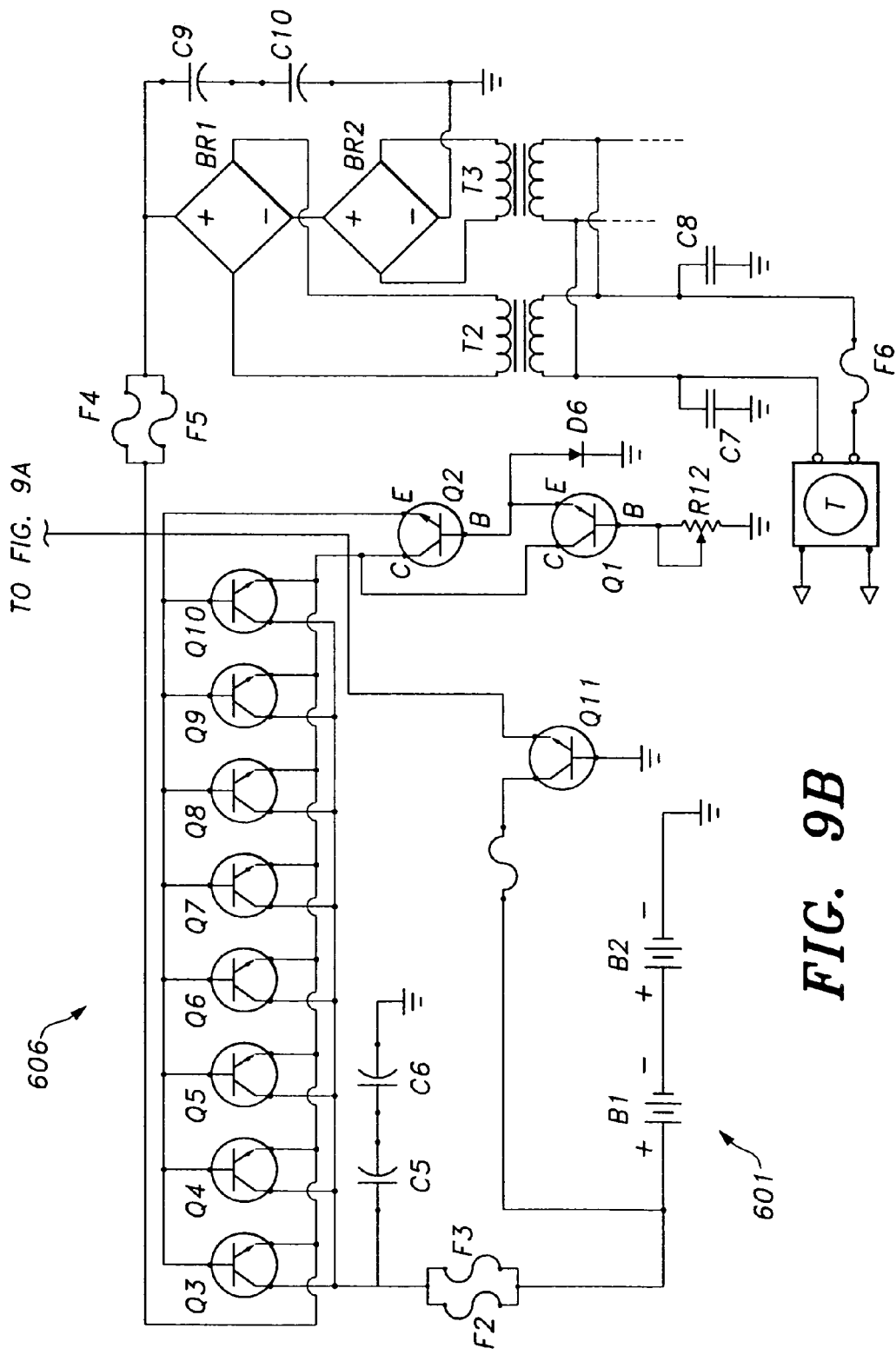
FIG. 9B is a continuation of the schematic view of FIG. 9A, according to the present invention.

As shown in FIGS. 8, 9A, and 9B, when the electrical energy source 105 is connected to house wiring via breaker panel interface cable 805, the control circuit 608 can direct the control switch 610 to switch the house wiring from the utility supplied AC source to the electrical energy source 105, and vice versa. Power switching may be accomplished manually via switch SW1 or automatically via low voltage detector IC1 which is capable of sending a signal from the control circuit 608 to the control switch 610 to switch the house wiring from the electrical energy source 105 to the utility source in response to a low voltage condition within the electrical energy source 105. Advantageously, the robust, preferably hardwired logic of control unit 608 requires no software code for operation, thereby increasing reliability of operation.

Additionally, a programmable dial up module 905 may be included and connected to a phone service line 910 to provide status notification of the electrical energy source 105 to a remote location.

As shown in FIGS. 11A-11D, power load line 1110 vs load time duration 1120 demonstrates high regulation of voltage and amperage output over a wide range of operating conditions, from no load, full utility mode, full service load with no utility service, utility service charging mode, and field use with no utility service charging available.

As shown in FIGS. 12A-12E, an alternative low profile wheeled embodiment 1205 may comprise an interface panel 1207, a battery compartment housing a battery 1210, and an upper compartment housing an inverter 1220. The bottom of the lower compartment may have battery cable outlets 1230. Upper compartment 1220 may have exposed heat sinks 1235, and a mesh guard 1240 covering cooling fans and power transistors.

Advantageously, solar panel technology can be added or used with the present invention for redundancy purposes. An automobile charging system may also be used to recharge the energy source 105. Although preferably the aforementioned regeneration device 625 may be used to keep the battery pack 601 charged. Once the batteries have been recharged, the AC inverters 605, 609, and 612 are again made available to the load.

Figure 2:
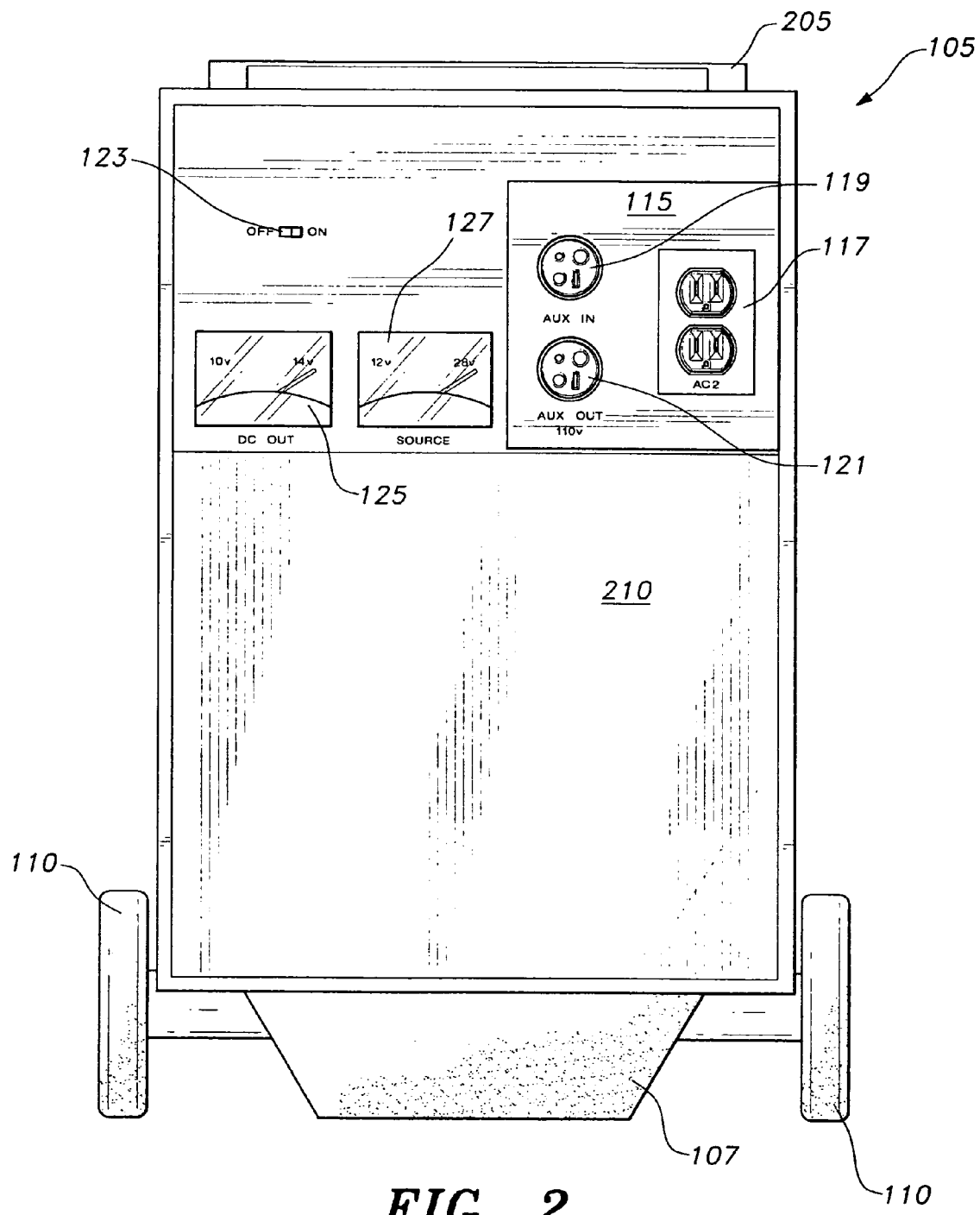
FIG. 2 is a front view of the electrical energy source, according to the present invention.

The system is environmentally safe because it does not use an internal combustion engine, and thus does not require fossil fuels for operation. The system is designed to provide voltages selectable from 110-220 volts and to provide power to loads which demand up to 3000 watts, and, as shown in FIG. 2, via appropriate interface receptacles at interface panel 115 may also provide DC power simultaneously with AC power.

The electric power source 105 of the present invention may be used like a conventional Uninterruptible Power Supply (UPS), or it may be used as the primary power source having predetermined time periods within which the load is switched to the utility (mains) source during a recharging cycle. The electric power source 105, according to the present invention provides power while emitting lower noise levels than the combustion engine counterpart power sources.

It is to be understood that the present invention is not limited to the embodiment described above, but encompasses any and all embodiments within the scope of the following claims.

I claim:

1. An electrical energy source, comprising:
    an enclosure;
    at least two batteries electrically connected in series and being disposed in the enclosure;
    at least one battery charger being disposed in the enclosure, the battery charger being in electrical communication with a charging circuit including at least one half-wave bridge rectifier, at least one transformer, and at least one diode;
    at least one DC to AC power inverter being disposed in the enclosure;
    a DC driver circuit having an input connected to the batteries;
    the DC driver circuit having an output responsive to battery current detected at the DC driver circuit input;
    a DC output stage having a DC driver receiving input and a low voltage, high current output, the DC output stage being provided to perform a DC to DC conversion to reduce a voltage produced by the at least two batteries connected in series, the DC to DC conversion supplying input to drive the DC to AC power inverter;
    the DC output stage DC driver receiving input having a connection to the DC driver circuit output, the connection being provided to control the DC to DC conversion;
    the low voltage, high current output of the DC output stage being connected to an input of a DC filter;
    a first output of the DC filter being connected to an input of the at least one DC to AC power inverter;

a second output of the DC filter being connected to a DC filter input of a control unit;

a switch control output of the control unit being connected to an AC control switch in order to provide a switch control signal;

an AC power output of the at least one DC to AC power inverter being connected to the AC control switch, the AC control switch having the capability to connect and disconnect the AC power output of the inverter to and from an AC outlet port responsive to the switch control signal from the control unit, the AC outlet port being disposed on the enclosure;

the control unit having an AC input from an external source, the control unit having the capability to route the external source AC input to the charger for a predetermined charging time period;

a timer, being operably connected to the charger and to the control unit in order to set the predetermined charging time period, the timer having at least one bi-directional electrical interface to the control unit;

an on/off switch provided for powering up the electrical power source, and alternatively powering down the electrical power source; and, wherein when the electrical energy source is powered up and delivering electrical power to a load, the control unit, responsive to a change in the second output from the DC filter, interrupts electrical power delivery from the electrical energy source to the load and initiates recharging of the batteries for a predetermined time determinable by the timer after which predetermined time the control unit reestablishes power delivery to the load by the electrical energy source.

2. The electrical energy source according to claim 1, wherein the at least two batteries comprises at least one sealed battery pack.

3. The electrical energy source according to claim 2, wherein the sealed battery pack comprises spiral wound plate batteries.

4. The electrical energy source according to claim 2, wherein a plurality of the at least one sealed battery pack electrically connected in parallel with each other.

5. The electrical energy source according to claim 1, wherein the DC output stage comprises a plurality of Insulated Gate Bipolar Transistors (IGBT array) in order to provide the high current controlling capability and DC to DC voltage conversion required by the at least one DC to AC power inverter.

6. The electrical energy source according to claim 1, wherein the external source AC input to the charger is a utility line.

7. The electrical energy source according to claim 1, further comprising: a regeneration device; the regeneration device having an input and an output; the regeneration device input being connected to the AC power output of the at least one DC to AC power inverter; the regeneration device output being operably connected to the timer and the control unit in order to provide routing of the regeneration device output to the at least one battery charger.

8. The electrical energy source according to claim 7, wherein the external source AC input to the charger is the regeneration device output.

9. The electrical energy source according to claim 7, wherein the regeneration device further comprises: a drive motor, the drive motor being mounted on a base plate; a concentric belt sheave assembly that includes a larger diameter sheave concentrically attached to a smaller diameter sheave, the concentric belt sheave assembly being mounted on the base plate; a power generator, the power generator being mounted on the base plate; a first belt rotatably connecting the drive motor to the smaller sheave; a second belt rotatably connecting the power generator to the larger sheave; the input being electrical power leads on the drive motor; and, the output being electrical output leads on the power generator; wherein when the drive motor is powered up by the at least one of the inverter/filters, rotation of the drive motor transmitted to the sheave set causes the power generator to rotate due to the rotatable connection of the sheave set to the power generator thereby producing voltage at the power generator's output required by the battery charger to recharge the batteries of the electrical energy source.

10. The electrical energy source according to claim 7, wherein the regeneration device is disposed on the enclosure.

11. The electrical energy source according to claim 1, further comprising: an auxiliary input port through which charging voltage from auxiliary sources such as solar power generators, automotive/marine power sources, and the like, may be provided by a connection to the auxiliary input port.

12. The electrical energy source according to claim 1, further comprising: an ammeter having a connection between the battery charger and a series resistor to ground in order to provide monitoring capability of the charging process.

13. The electrical energy source according to claim 1, wherein the DC driver circuit includes a voltage regulator to provide a voltage regulation function of the DC driver circuit.

14. The electrical energy source according to claim 13, wherein the voltage regulator comprises a Darlington pair of transistors having a set-point determined by a resistor connected between the base of one of the transistors and ground.

15. The electrical energy source according to claim 9, wherein the ratio of the larger diameter sheave to the smaller diameter sheave is approximately 4:1 in order to produce a high torque output to rotate the generator.

16. The electrical energy source according to claim 9, wherein the drive motor has a rotational speed of approximately 1,700 RPM.

17. The electrical energy source according to claim 9, wherein the power generator has a rotational speed of approximately 2,200 RPM.

18. The electrical energy source according to claim 1, further comprising: a programmable dial up module having a connection to a phone service line to provide status notification of the electrical energy source to a remote location.

19. The electrical energy source according to claim 1, further comprising: a breaker panel interface cable capable of being connected between a house wiring breaker panel and the electrical energy source so that the electrical energy source can provide power to the house wiring instead of a utility source.

20. The electrical energy source according to claim 1, further comprising: a crystal controlled timing circuit being in operable communication with power switching transistors of the at least one inverter/filter; the crystal controlled timing circuit being capable of converting inverter input power to pulses by switching action of the crystal controlled timing circuit.

* * * * *